(12) United States Patent
Bonasia et al.

(10) Patent No.: US 7,219,141 B2
(45) Date of Patent: May 15, 2007

(54) METHOD OF ADDING A DEVICE TO A NETWORK

(75) Inventors: Gaetano Bonasia, Bronx, NY (US); David P. Eckel, Eaton's Neck, NY (US); Stephen P. Hebeisen, Somers, NY (US); Ross Mernyk, Brooklyn, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 35 days.

(21) Appl. No.: 11/137,810

(22) Filed: May 25, 2005

(65) Prior Publication Data

US 2006/0009861 A1    Jan. 12, 2006

Related U.S. Application Data

(62) Division of application No. 09/488,381, filed on Jan. 20, 2000, now Pat. No. 6,901,439.

(60) Provisional application No. 60/116,832, filed on Jan. 22, 1999.

(51) Int. Cl.
*G06F 15/177* (2006.01)
*G06F 15/173* (2006.01)

(52) U.S. Cl. .................... 709/220; 709/223; 709/250

(58) Field of Classification Search ............... 709/220, 709/223, 250
See application file for complete search history.

(56) References Cited

U.S. PATENT DOCUMENTS

| | | | |
|---|---|---|---|
| 5,875,301 A * | 2/1999 | Duckwall et al. | 710/8 |
| 5,895,452 A * | 4/1999 | Lum | 705/16 |
| 6,175,860 B1 * | 1/2001 | Gaucher | 709/208 |
| 6,243,773 B1 * | 6/2001 | Mahalingam | 710/302 |
| 6,275,865 B1 * | 8/2001 | Zou | 719/313 |
| 6,336,152 B1 * | 1/2002 | Richman et al. | 710/8 |
| 6,496,862 B1 * | 12/2002 | Akatsu et al. | 709/224 |
| 6,501,746 B1 * | 12/2002 | Leung | 370/338 |
| 6,584,096 B1 * | 6/2003 | Allan | 370/352 |
| 2006/0179138 A1 * | 8/2006 | Van Gassel et al. | 709/225 |

* cited by examiner

*Primary Examiner*—Larry D. Donaghue
(74) *Attorney, Agent, or Firm*—Paul J. Sutton

(57) ABSTRACT

A method of adding a device to an existing or new electrical or electronic automation or multimedia network. The invention facilitates adding a device to the network that can communicate using various protocols such as LonWorks, CEBus, X-10, etc. over media such as AC power line, IR, RF, twisted pair, optical fiber, etc. The method is a mechanism for adding a device to a system that can be used by an ordinary user of network capable electrical devices. The method comprises the steps an installer would perform including the handshaking that needs to occur between devices to accomplish the binding process. A Functional Profile for LonWorks networks is given as an example. This includes a Home Device profile that employs an automated explicit type messaging for all devices intended for use in a home environment. The invention includes adding to the device an install button and a visual indicator for status such as an LED. Alternatively, existing buttons and LEDs on the device may be used for installed and binding purposes. Other methods of binding can be employed by the use of wired or wireless handheld tools, remote controls, etc. Other interfaces and user feedback can be used such as touch screen, personal computers, cellular phones, PDAs, etc which can offer simple 'virtual' binding by the press of an icon versus the physical button on the device. The binding can be performed locally or remotely such as via LAN, WAN, Internet, etc.

10 Claims, 21 Drawing Sheets

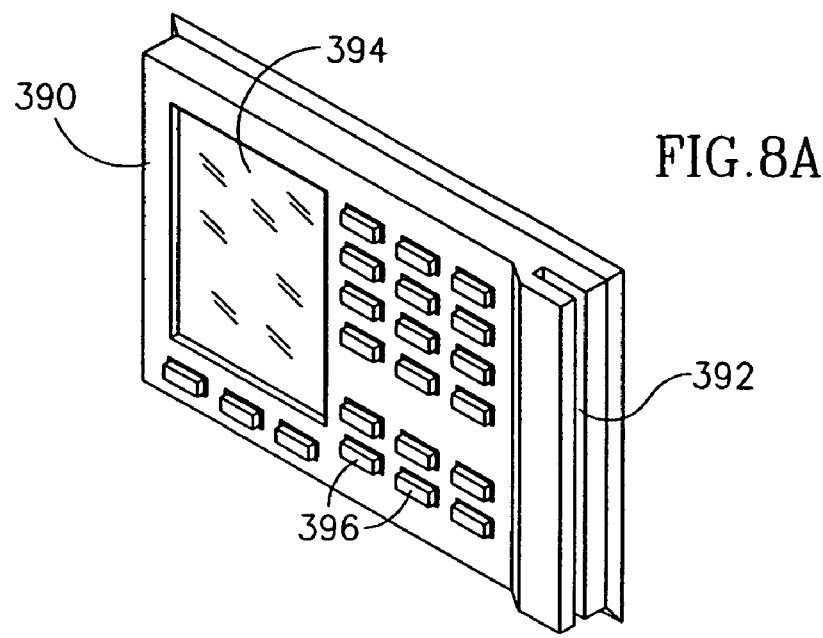
FIG.8A
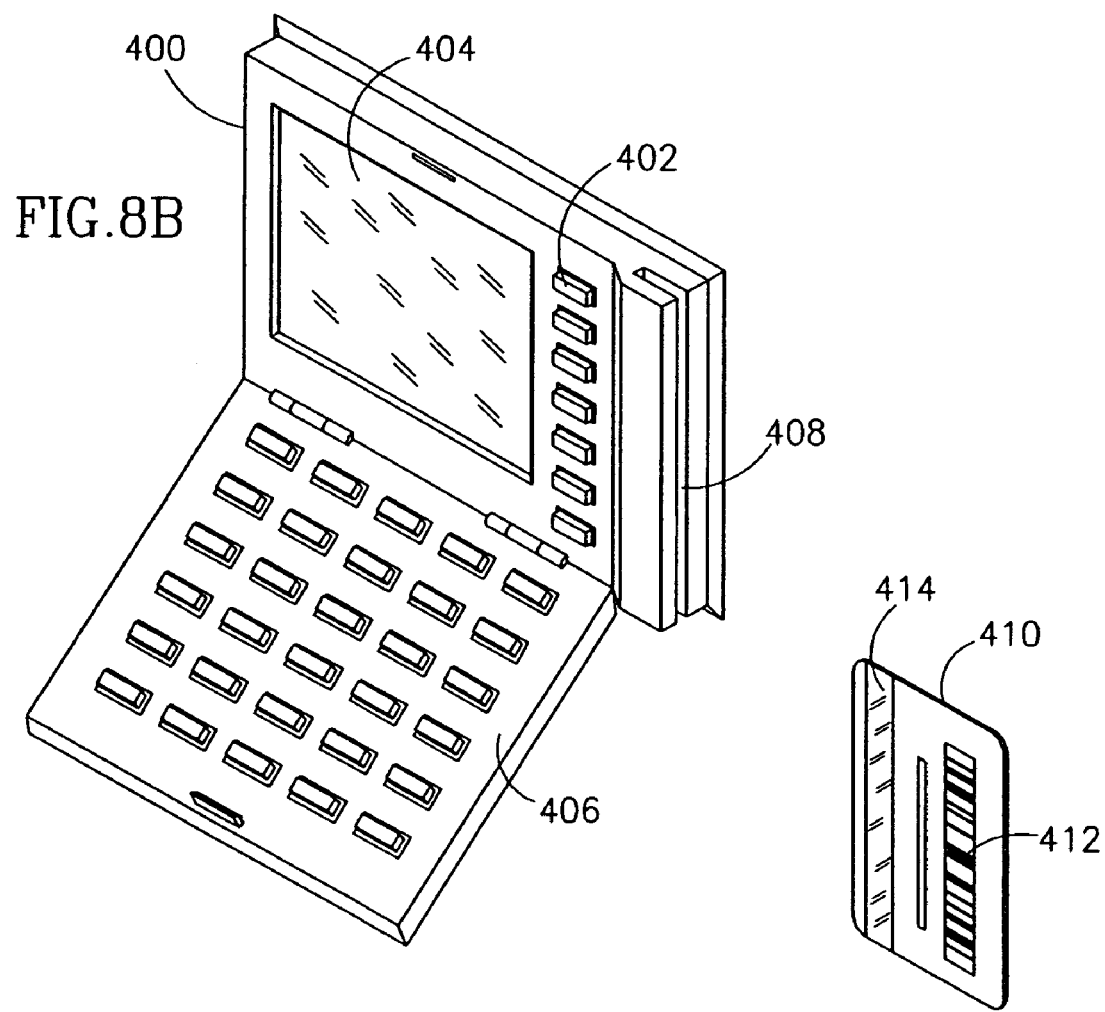
FIG.8B
FIG.8C

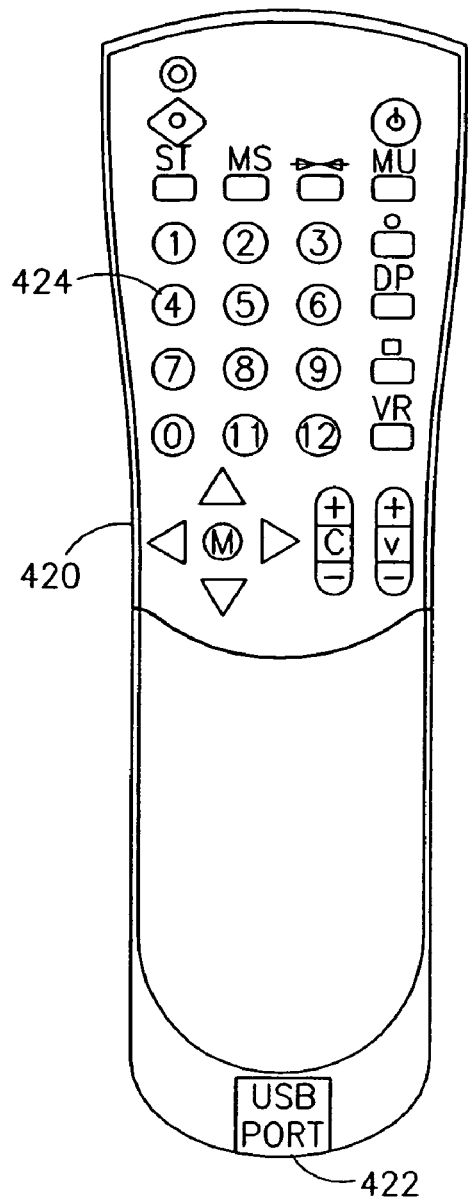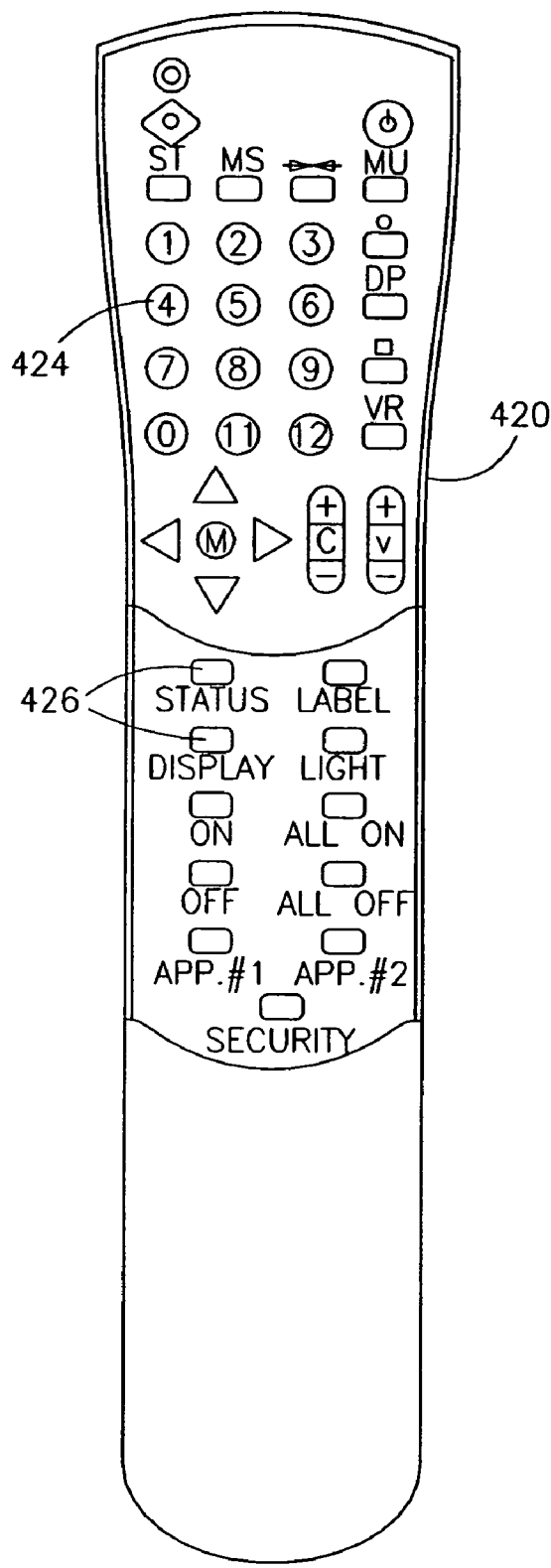
FIG.9A
FIG.9B

METHOD OF ADDING A DEVICE TO A NETWORK

REFERENCE TO RELATED APPLICATIONS

This application is a divisional of application Ser. No. 09/488,381, filed Jan. 20, 2000, which claims the benefit of U.S. Provisional Application Ser. No. 60/116,832, filed Jan. 22, 1999, entitled "Apparatus For and Method of Binding A Device to a Network Interoperable," incorporated herein by reference. now U.S. Pat. No. 6,901,439.

FIELD OF THE INVENTION

The present invention relates generally to the field of home automation and more particularly to a method of adding (e.g., binding) one or more devices to an electrical network such as the LonWorks automation network or a multimedia network.

BACKGROUND OF THE INVENTION

Today, automation systems are being installed in more and more buildings, including both new construction and in structures that are being rebuilt. The incentives for putting automation systems into a building are numerous. High on the list are reduced operating costs, more efficient use of energy, simplified control of building systems, ease of maintenance and of effecting changes to the systems. Facility managers would prefer to install systems that can interoperate amongst each other and also be able to make additions and changes to the system in an efficient manner. Interoperability is defined by different products, devices and systems for different tasks and developed by different manufacturers, which can be linked together to form flexible, functional control networks.

An example of a typical automation system includes lighting controls, HVAC systems, security systems, fire alarm systems and motor drives all possibly provided by different manufacturers. It is desirable if these separate disparate systems can communicate and operate with each other.

One of the major technological issues, however, that have hindered the proliferation of automation systems (such as LonWorks and others) in the home, is that users feel (1) it takes too long, (2) that it always requires a computer and (3) that it is too complicated a process to install and setup a device. In particular, the part of the installation or configuration process that is most problematic is the binding portion, where electrical devices are configured to be recognized by other entities on the network once they have been physically and electrically installed.

The term 'home automation' has been around for more than 25 years, but the average homeowner does know what this term means. Within the home, it is becoming more and more popular to utilize devices which communication over a network or bus structure to autonomously control various aspects of the home environment without the need for direct interaction by the inhabitants. As an example, an application might be to use a motion sensor to detect the presence of a car in the driveway. The system would then send a signal to the home controller that something was present. In response, the controller may query the security portion of the system to check if the visitor is not an intruder, and upon the absence of an alarm condition, would open the garage door and change the status of the home from 'away' to 'home'. Subsequently, the system may disarm one or more security zones on the premises and has the lighting subsystem illuminate the driveway and walkway lighting systems. The HVAC subsystem may turn the hot water boiler on for an anticipated bath and turn on the air conditioner or heater in one or more rooms in the home. In addition, the entertainment system may recognize the homeowner and play chosen music selections, or turn on the television and tune to a favorite channel.

This type of automation control requires explicit communication between the various control, sensor and data devices in the home. The various subsystems that are required to communicate with each other include lighting, security, HVAC, entertainment and information/Internet, for example. The complexity in setting up the system grows, as the complexity of the features installed in the home becomes more sophisticated. Unfortunately, setting up a system using currently available devices is not as simple as choosing the desired devices and wiring them into the network. Wiring the devices is relatively simple and straightforward; the task of ensuring that devices know whom they are, what they are supposed to do and how to talk to other devices on the network is difficult.

Prior to installing a home automation system, the installer must (1) select suitable equipment and devices; (2) appraise the infrastructure requirements, e.g., phase couplers, repeaters, filters, routers, gateways, etc.; (3) appraise the tools required to physically and electrically install the devices; (4) appraise the tools to bind devices together; and (5) appraise the tools to set the functionality in each device.

The expertise needed to perform all these tasks dictates who the installer can be and ultimately who the customer can be. As the technical expertise of the installer increases, the cost to employ that installer increases, adding cost to the automation system. Currently, for proprietary networks, a specialized team or dealer network is trained to install the home automation products. For open protocols, often times a custom installer or system integrator is to integrate the various applications together. Here too, the individuals used to install and/or integrate the devices typically consist of a specialized team to integrate the various subsystems together.

The average homeowner typically does not have technical knowledge and thus most of the products directed to homeowners plug into wallbox receptacles or are battery operated. Communications, if present, is usually accomplished over AC wiring or via RF. If addressing is required, the devices come preconfigured, i.e., prebound, or the user interface includes setting a position on a switch. Popular examples of this type of product include X-10 plug-in products.

The do-it-yourselfer (DIY) is considered to have a bit more technical knowledge that the average homeowner. This person will install devices in place of currently present AC receptacles, switches, etc. in the home. They may modify the wiring within the home to accommodate the devices to be installed. An electrician may be called in to accomplish this. The user interface typically is very simple comprising of a few switches or perhaps a single computer program to setup and control the devices.

An electrician or security installer or audio/video installer represents a medium expense professional installer who is familiar with both high voltage and low voltage wiring and maybe with telecom wiring. They are not necessarily computer literate and may be trained to use a handheld LCD display with a keyboard attached to install and configure the system.

The systems integrator/custom installer/home automation installer is proficient with computers and low voltage wiring. They have the required technical knowledge to install, configure and troubleshoot connection problems on both high voltage and low voltage wiring. They can work with devices that do not have a physical user interface, but are configured using a software program on a PC that communications with the entire network in the home. Examples include CEBus, LonWorks, Lutron HomeWorks, LiteTouch, Vantage, etc.

Prior art automation systems each have specific mechanisms of adding new devices to the network. CEBus Home Plug and Play (Hpnp), for example, includes a recommended practice for the user interface which is to be used during configuration of newly installed or reconfigured devices. The recommended method, however, is very slow, tedious and confusing to a user. It also consumes considerable firmware overhead for each device. Groups are not supported and user feedback is not uniform permitting the same indication to mean several different modes of operation.

LonWorks has the disadvantage of requiring an installation tool. Such tools are relatively difficult to operate and are relatively expensive, placing them out of reach of the typical consumer.

The X-10 system does achieve quick configuration although it utilizes a primitive, slow protocol. It does not have any provisions for cross-linked groups and is generally a one-way system, providing for a limited number of devices with limited functionality.

Thus it is desirable to be able to add a device, i.e., a networked product, to an automation network system in a relatively simple manner. The configuration of a network product device should be quick and simple as possible. It is desirable that a majority of users find the configuration process to be:

1. Fast—configuration should take less than one a minute per device.
2. Simple—configuration should be easier than programming a VCR.
3. Uniform—manufacturers should use common user interfaces.
4. Reassuring—the user should be kept apprised of the current point in the configuration process.
5. Clear—error codes should clearly indicate problems in a uniform manner.
6. Inexpensive—the interface should not add much cost to the device, and may share existing hardware such as LEDs and switches.

SUMMARY OF THE INVENTION

The present invention is a method of adding (e.g., binding as in the case of a LonWorks network) a device to an existing or new electrical automation or multimedia network. The invention facilities adding a device to the network that can communicate using various protocols such as LonWorks, CEBus, X-10, etc. over media such as AC power line, IR, RF, twisted pair, optical fiber, etc. The method disclosed herein includes a binding technique that can be used by an installer of network capable electrical devices. The method comprises the steps an installer would perform including the handshaking that needs to occur between devices to accomplish the binding process. In addition, a Functional Profile for LonWorks networks is given as an example. This example illustrates a special Home Device profile that employs an automated explicit type messaging for all devices intended for use in a home environment. Note, however, that it is not necessary for this Functional Profile to be employed for operation of the present invention. This functional profile may also have application in industrial and commercial settings as well as the home. Note also that one skilled in the art can apply the method of the present invention to network automation systems other than LonWorks such as CEBus, BACNet, etc. The present invention has applications in products geared towards the home automation market as well as products geared towards other areas such as the commercial, industrial, and utility markets.

It is intended that the invention provide a means for the electrician or average homeowner to perform the binding function on her/his own without the need to call in a systems integrator or other highly trained and typically costly professional. One embodiment comprises adding an install button and a visual indicator for status such as an LED to a device. In operation, the user wires the device into the electrical network and presses and holds a button until the LED lights or a buzzer is sounded indicating to the user that the device was added to the system. Alternatively, a pull switch, existing buttons and LEDs on the device may be used for installing and binding purposes. The button may be pressed for extended periods, and the LED may flash in a unique manner.

Alternatively, a hand held tool that operates over any type of wireless media such as IR or RF can be employed as well. The chief benefit of using a wireless media type is that devices installed in difficult to reach places can be bound in a simple manner. Alternatively, line of sight or IR binding can be employed in combination with an AutoCAD layout of the facility. This functions to bind the devices together in addition to having the binding information automatically saved in an AutoCAD file which identifies the physical location of the device within the building. This functionality may be useful for certain fire and safety code requirements for certain systems.

Further, software icons can be created and placed on a touch screen equipped computer thus making the binding process much simpler such as during the initial installation so as to verify that the devices were wired and installed correctly. The detailed binding of some devices may be performed initially or may be performed after installation by a more highly trained individual. In accordance with the invention, the results of the simple binding method are readable, importable to another device and are able to be used by higher end network management tools (if any are present).

The present invention provides a means to connect electrical devices to the network either by installing the device and subsequently pressing a button; by installing the device and using voice activation to announce that the device is ready to be bound to the system; or to plug in or wire the device and have it automatically recognize that power has been applied, communications is available and would then bind itself automatically to the network.

The invention also comprises software, optionally in the form of embedded code or macro functions that perform the binding of the device to the network and also perform a series of preset or network downloadable functions. The device would then optionally provide a visual and/or audible indication (e.g., illumination of an LED) to indicate that the device was successfully added to the network.

The invention comprises means of providing a consistent user interface for the device and consistent feedback from the device. For simple devices, for example, a momentary pushbutton may is employed on the devices and the feedback to the user comprises an LED. This may be used in low cost implementations of the invention.

Alternatively, various types of installation/management tools may be used to perform the binding function such as handheld or other types of remote control units. These units may be connected locally or via a network. For example, the connection may be implemented using twisted pair, IR, RF, optical. Alternative implementations may use a touch screen or PC and mouse combination whereby one simply clicks the icon on the screen to bind one device to another. In this case, more sophisticated feedback can be provided to the user. One skilled in the art could integrate such a binding solution into any of the higher end network management tools currently available such as LNS from Echelon, Peak Components package from ICELANG or other vendor's network management systems whereby the functional profile in the particular device(s) to be bound can be read.

It is important to note that in accordance with the present invention the process of binding a device to the network can be performed in a variety of ways. The binding can be performed locally via (1) means on the device itself such as one or more pushbuttons or (2) an external binding tool connected to the device via a hardwired or wireless connection (e.g., IR, RF, optical, etc. Alternatively, the binding may be performed remotely via a network such as a WAN, LAN, Internet, etc. In this case, the device is adapted to comprise the necessary means of communicating over the specific type of network.

There is provided in accordance with the present invention a method of adding a device to an automation or multimedia network, the method comprising the steps of binding the device as a first device to be bound when the device is the first device to be installed in the network, binding the device as an additional device to be bound when the device is not the first device to be installed in the network and binding the device as an existing device to be bound when the device was previously installed in the network.

There is also provided in accordance with the present invention a method of installing and binding a device previously wired into an automation or multimedia network when the device is the first device to be installed in the network, the method comprising the steps of placing the device in a first-device installation mode of operation, assigning to the device a domain ID having an associated length and which is not in use by any other device on the network, assigning to the device a subnet number and a device ID number and generating an indication to indicate that the installation of the device onto the network is complete.

The step of placing the device in a first-device installation mode of operation comprises pressing an holding a pushbutton switch on the device, receiving a command from a local management tool connected directly to the device, receiving a command from a remote management tool connected remotely over the network or setting a visual or audible indication confirming that the device is in the installation mode of operation.

The step of assigning to the device a domain ID comprises the steps of querying the network using the assigned domain ID, listening for a response to the query and assigning a new domain ID different than the original domain ID in the event a response is received within a predetermined time period. The step of assigning to the device a domain ID comprises the steps of querying the network using the assigned domain ID, listening for a response to the query, assigning a new domain ID different than the original domain ID in the event a response is received within a predetermined time period and querying the network using the assigned domain ID at least an additional two times in the event a response is not received within a predetermined time period.

There is further provided in accordance with the present invention a method of installing and binding a new device previously wired into an automation or multimedia network when the device is other than the first device installed in the network, the method comprising the steps of placing the device in an additional-device installation mode of operation, placing address information of a previously installed and bound device onto the network, receiving the address information by the new device to be installed and updating its domain and subnet address information in accordance therewith, assigning a device ID number to the new device, generating an indication to indicate that the installation of the new device onto the network is complete, installing and binding zero or more additional new devices to the new device and installing and binding zero or more existing devices to the new device.

The step of receiving the address information may comprise the steps of waiting for reception of the address information sent from the previously installed and bound device and generating an error indication in the event no response is received after expiration of a predetermined time period. The step of assigning a device ID number to the new device comprises the steps of querying the network using the assigned device ID number, listening for a response to the query and assigning a new device ID number different than the original device ID number in the event a response is received within a predetermined time period.

The step of assigning a device ID number to the new device may also comprise the steps of querying the network using the assigned device ID number, listening for a response to the query, assigning a new device ID number different than the original device ID number in the event a response is received within a predetermined time period and querying the network using the assigned device ID number at least an additional two times in the event a response is not received within a predetermined time period.

The step of installing and binding additional new devices includes the steps of placing the additional new device in an additional-device installation mode of operation, placing address information of the new device onto the network, receiving the address information sent by the new device by the additional new device to be installed, updating domain and subnet address information in the additional new device in accordance with address information received from the new device, assigning a device ID number to the additional new device and generating an indication associated with the additional new device to indicate that the installation of the additional new device onto the network is complete.

The step of installing and binding an existing device includes the steps of sending a message incorporating a first home profile from the existing device to the new device, updating a second address table within the new device in accordance with the first home profile, sending a message incorporating a second home profile message from the new device to the existing device, updating a first address table within the existing device in accordance with the second home profile, generating an indication associated with the existing device to indicate that the installation and binding of the existing device is complete.

There is also provided in accordance with the present invention a method of binding a first existing device into an automation or multimedia network, the method comprising the steps of placing the first existing device in an existing-device mode of operation, receiving at the first existing device a confirmation message generated by the second existing device, sending a first message incorporating a first home profile from the first existing device to the second existing device, updating a second address table within the second existing device in accordance with the first home profile, sending a second message incorporating a second home profile message from the second existing device to the first existing device, updating a first address table within the first existing device in accordance with the second home profile, generating an indication associated with the first existing device to indicate that the installation and binding of the first existing device is complete.

There is still further provided in accordance with the present invention a method of adding a CEBus compatible device to a CEBus network, the method comprising the steps of issuing a connect command to a context, determining whether the context is in identify house mode and indicating hunting if it is not, hailing for a house code and subsequently for an unused unit address and indicating the occurrence of an error in the event a unique address is not found within a predetermined time period.

There is also provided in accordance with the present invention a method of adding a CEBus compatible device to a CEBus network, the method comprising the steps of receiving a connect command by a provider, hailing so as to determine whether another provider on the same house code is already in connecting mode, indicating with the context that no other provider on the same house code is already in connecting mode, indicating the occurrence of an error in the event another provider on the same house code is already in connecting mode, entering connect mode by the context for a specified period of time and answering connection hails to house code with unit address zero corresponding to the provider.

There is further provided in accordance with the present invention a method of adding a CEBus compatible device to a CEBus network, the method comprising the steps of receiving a connect command by a listener, hailing so as to search for a provider in connecting mode, swapping connection packets between the context and the connecting provider, indicating ready if the swap was successful and indicating the occurrence of an error in the event no provider is found, the connection is rejected or the swap was not successful.

There is also provided in accordance with the present invention a method of adding a first provider and listener context to a CEBus network, the method comprising the steps of issuing a first-in-home context, issuing an identity house command, issuing a connect command to the provider context and waiting for connecting indication, issuing connect command to the listener context and waiting for a ready indication, repeating the step of issuing connect command to a listener context for each additional listener, issuing a stop command and indicating ready.

In addition, there is provided in accordance with the present invention a method of adding additional devices and adding additional connections to a CEBus network, the method comprising the steps of issuing an identity house command, issuing a connect command to provider context and waiting for connecting indication, issuing connect command to the listener context and waiting for ready indication, repeating the step of issuing connect command to a listener context for each additional listener, issuing a stop command to the new provider and to the device in identifying house mode.

BRIEF DESCRIPTION OF THE DRAWINGS

The invention is herein described, by way of example only, with reference to the accompanying drawings, wherein:

FIG. 8A is a diagram illustrating a network management tool incorporating a magnetic card swipe means;

FIG. 8B is a diagram illustrating a network management tool incorporating a display screen, keyboard and magnetic card swipe means;

FIG. 8C is a diagram illustrating an example 'install' card including a magnetic strip and/or a machine-readable bar code;

FIG. 9A is a diagram illustrating an example handheld remote control installation tool;

FIG. 9B is a diagram illustrating an example handheld remote control installation tool wherein the binding related controls are exposed to view;

DETAILED DESCRIPTION OF THE INVENTION

Notation Used Throughout

Figure 1:
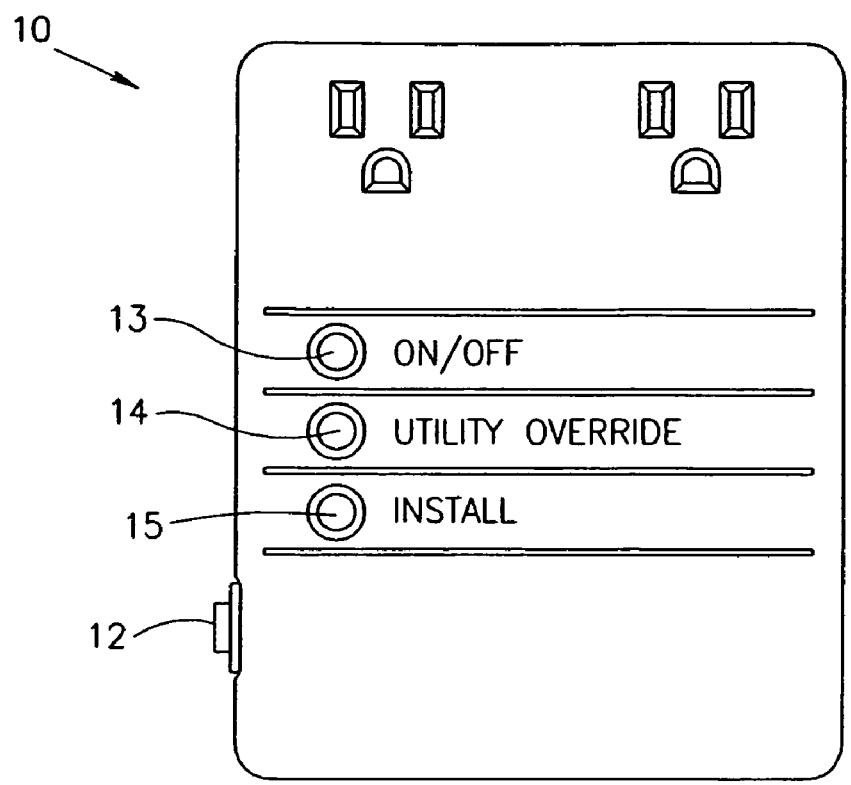
FIG. 1 is a front view illustration of a first example embodiment of the present invention including a LonWorks compatible receptacle incorporating a button and multiple status indicators.

The following notation is used throughout this document.

| Term | Definition |
| --- | --- |
| AC | Alternating Current |
| BACNet | Building Automation and Control Network |
| CEBus | Consumer Electronics Bus |
| DIY | Do It Yourself |
| DLL | Dynamic Link Library |
| EEPROM | Electrically Erasable Programmable Read Only Memory |
| Hpnp | Home Plug And Play |
| HVAC | Heating Ventilation Air Conditioning |
| IC | Integrated Circuit |
| IR | Infrared |
| LAN | Local Area Network |
| LCD | Liquid Crystal Display |
| LED | Light Emitting Diode |
| OS | Operating System |
| PC | Personal Computer |
| PDA | Personal Digital Assistant |
| RAM | Random Access Memory |
| RF | Radio Frequency |
| ROM | Read Only Memory |
| SNVT | Standard Network Variable Type |
| USB | Universal Serial Bus |
| VCR | Video Cassette Recorder |
| WAN | Wide Area Network |

General Description

The present invention comprises a method of connecting electrical or electronic devices to an automation or multimedia network such that they are assigned an address and are configured so as to be recognized by other devices on the network. The automation network may be adapted for home, industrial or commercial use. The device is added to the network either by installing the device and subsequently pressing a button; by installing the device and using voice activation to announce that the device is ready to be bound to the system; or by plugging in or wiring the device to the network and having it automatically recognize that power has been applied, communications is available and then binds itself automatically to the network.

Additionally, the device may also be added to the network through the use of hand held or other types of tools that operate using any suitable interface means, such as hardwired, twisted pair, wireless, IR or RF as well as other types of user interfaces such as touch screens and computers, PDAs and other like devices. Devices can also be bound through other suitably modified audio/visual equipment such as a television, stereo, VCR or set top box. Further, a gateway or router device may be used to bind a device. Yet still other binding methods include the use of a smart 'install card' that is supplied with the device. The card could be disposable (i.e., designed for one time use only) and would contain all appropriate data such as the device's Neuron ID (i.e., the node ID) and device or program ID needed to perform the binding operation.

The invention also comprises software, optionally in the form of embedded code or macro functions that perform the binding of the device to the network and also perform a series of preset or network downloadable functions. The device would then illuminate an LED to indicate that the device was successfully added to the network.

A key feature of the binding method of the present invention is that it can be utilized as a low cost alternative to currently available higher cost binding solutions, such as a network management tool (PC based or otherwise). The invention functions to update the same address tables internal to the device in a similar manner as the currently available higher priced network management tools. In accordance with the invention, the bindings created and stored in a particular device when it is added to the network can be re-used in the future with conventional network management tools. A conventional network management tool can access the address tables in the devices and retrieve the binding information without the need to rebind the devices thus saving time and costly setup charges. When a device is added to the network, the management tool can optionally choose to delete the existing information or to extract and use the information currently configured in the device.

A front view illustration of a first example embodiment of the present invention including a button and multiple status indicators is shown in FIG. 1. The first example embodiment, generally referenced 10, comprises an install button 12 and several indicators including an on/off indicator 13, a utility override indicator 14 and an install indicator 15. Note that the receptacle is only shown as an example, as the invention may be adapted to numerous other electrical and electronic devices as well.

The indicators are each a different color for more easily distinguishing between them. The on/off indicator 13 can be green, for example, and when on indicates that the relay contacts are closed and when off indicates when the relay contacts are open. The utility override indicator 14 can be yellow, for example, and when on indicates that the utility is in control and when off indicates that the device is under local control. The install indicator 15 can be red, for example, and when off indicates that the device is configured, i.e., bound, to the network and blinking indicates that the device is currently not configured to the network.

Figure 2:
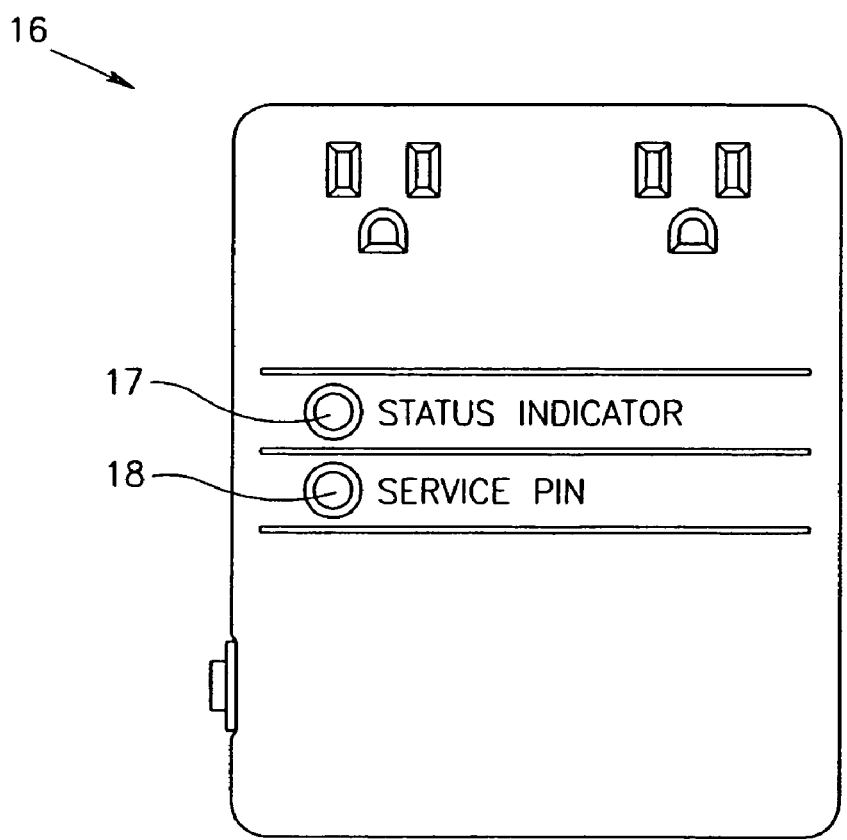
FIG. 2 is a front view illustration of a second example embodiment of the present invention including a LonWorks compatible receptacle incorporating a button and a single status indicator.

A front view illustration of a second example embodiment of the present invention including a button and a single status indicator is shown in FIG. 2. The second example embodiment, generally referenced 16, comprises a service pin 18 and a status indicator 17 that may comprises an LED. Note that the receptacle is only shown as an example, as the invention may be adapted to numerous other electrical and electronic devices as well.

Products designed for LonWorks and CEBus networks typically already comprise a status LED and a service pin. This reduces the effort needed to adapt the binding method of the present invention to existing network devices. The service pin and the status LED play different roles at different times depending on the current device context, mode of operation, input received, etc. Thus, during the installation/binding phase, the service pin functions as an install button. In addition, the status indicator may comprise a multicolored LED and may be turned on and off, blinked, flashed, etc. using a variety of patterns to indicate one or more specific status indications.

Figure 3:
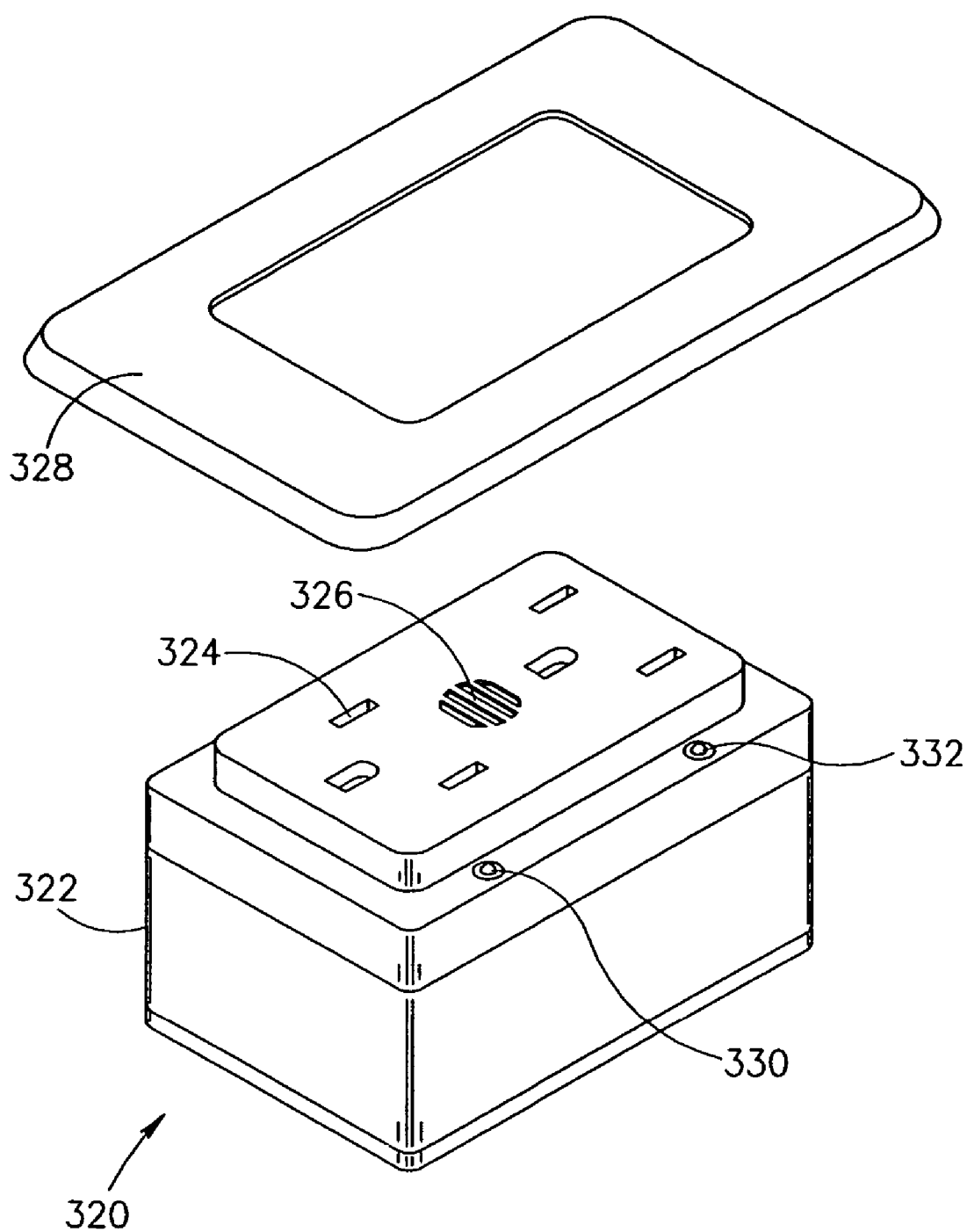
FIG. 3 is a perspective view illustration of a third example embodiment of the present invention including a LonWorks compatible receptacle incorporating a button and a single status indicator.

A perspective view illustration of a third example embodiment of the present invention including a LonWorks compatible receptacle incorporating a button and a single status indicator is shown in FIG. 3. The third example embodiment, generally referenced 320, comprises a housing 322 constructed from any suitable material such as plastic, one or more receptacles 324 and a vent 326. In addition, the device comprises one or more button switches 330 and one or more indicators 332 that typically reside under a wall plate covering 328. Placing the buttons and indicators under the wall plate elicits a conscious effort on the part of the user to change the settings of the device. Thus, the wall plate provides some security against accidental changes to the configuration of the device. The buttons may include an install button, utility override button, service pin button, etc. The indications may include an on/off indicator, a utility override indicator, status indicator and an install indicator. The indicators may function as described in connection with the device of FIGS. 1 and 2.

The device may also comprise means for communication over a network so as to enable the device to be bound remotely via software means from a network management tool located on the network. Local binding may be performed using the service pin and the status indicator (e.g., LED) which may play different roles at different times depending on the current device context, mode of operation, input received, etc. Thus, during the installation/binding phase, the service pin functions as an install button. In addition, the status indicator may comprise a multicolored LED and may be turned on and off, blinked, flashed, etc. using a variety of patterns to indicate one or more specific status indications.

As described previously, the binding method of the present invention may include the use of a network management tool. The management tool may comprise a variety of currently available commercial computing platforms that are adapted to perform the methods of the present invention. In particular, the management tool may comprise one of the PDAs that are in common use today. Several examples of these are presented below.

Figure 4:
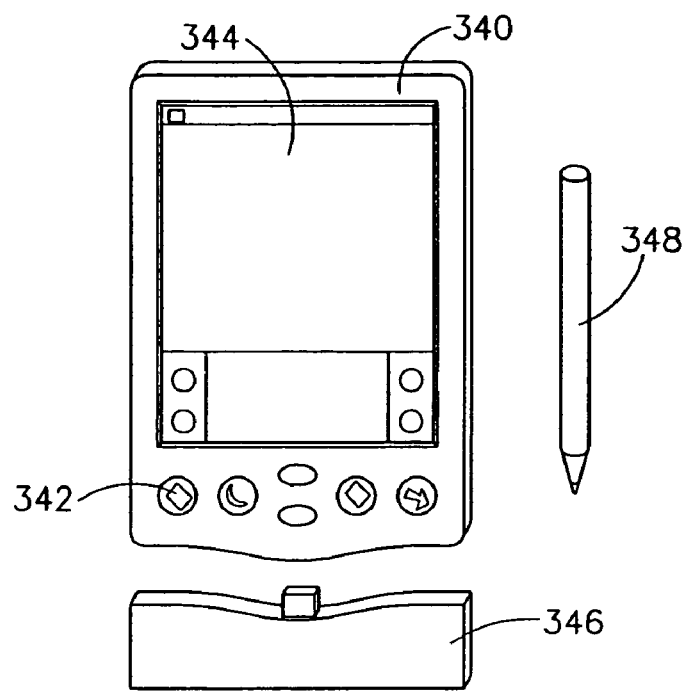
FIG. 4 is a diagram illustrating a first example of a network management tool constructed in accordance with the present invention comprising a handheld computing device.

A diagram illustrating a first example of a network management tool constructed in accordance with the present invention comprising a handheld computing device is shown in FIG. 4. This example PDA comprises housing 340, plurality of buttons 342, pointing tool 348, communications port 346 and display 344. The device executes a suitable operating system such as Palm OS (3Com Corporation) or Windows CE (Microsoft Corporation). The device may comprise any of the Palm PDAs manufactured by 3Com Corporation, Santa Clara, Calif., adapted to perform the methods of the present invention.

Figure 5:
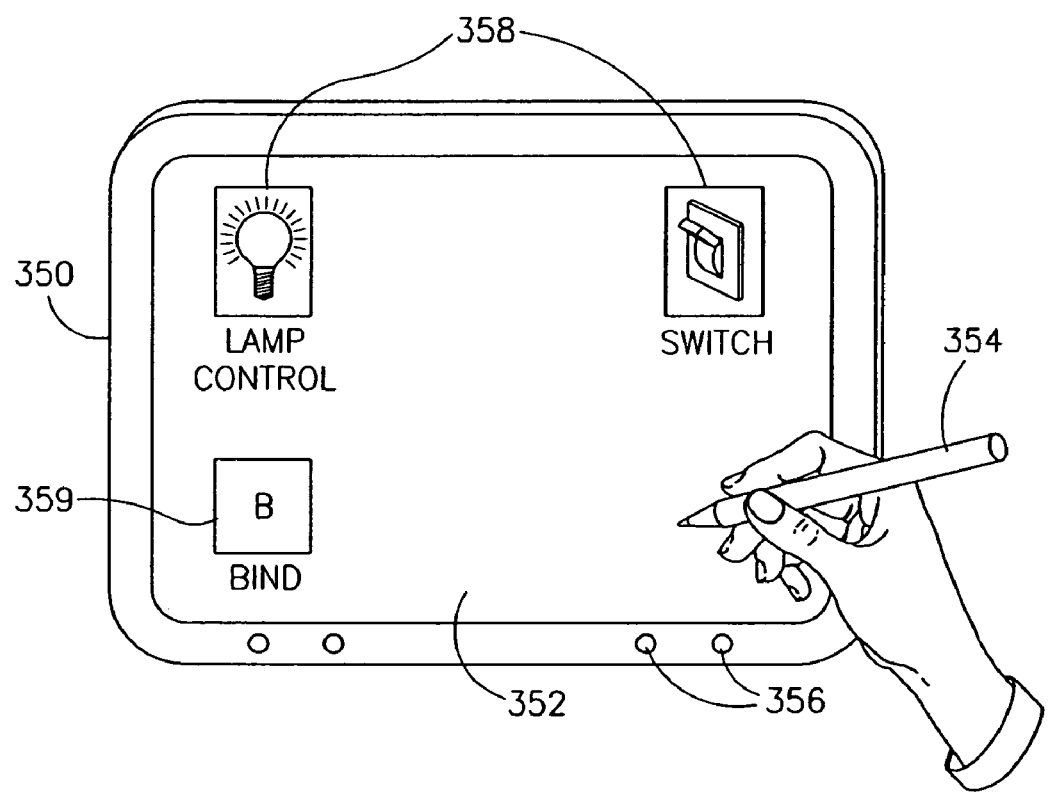
FIG. 5 is a diagram illustrating a second example of a network management tool constructed in accordance with the present invention comprising a handheld computing device.

A diagram illustrating a second example of a network management tool constructed in accordance with the present invention comprising a handheld computing device is shown FIG. 5. This example PDA comprises a housing 350, a plurality of buttons 356 (which are optional), a touch sensitive display 352 and a pen 354. In operation, a user uses the pen as a pointing and selection tool. The device executes a suitable operating system to drive the display and process user commands. The device may comprise the Amity XP, manufactured by Mitsubishi Mobile Computing, modified to perform the methods of the present invention.

In operation, the device may present one or more icons 358 on the touch sensitive display that represents elements of devices that can be bound. The user then selects one or more elements using the pen and touch sensitive screen to create a binding scenario for one or more devices. When the one or more devices are ready to be bound, the user selects the bind icon 359 to effect the binding.

Figure 6:
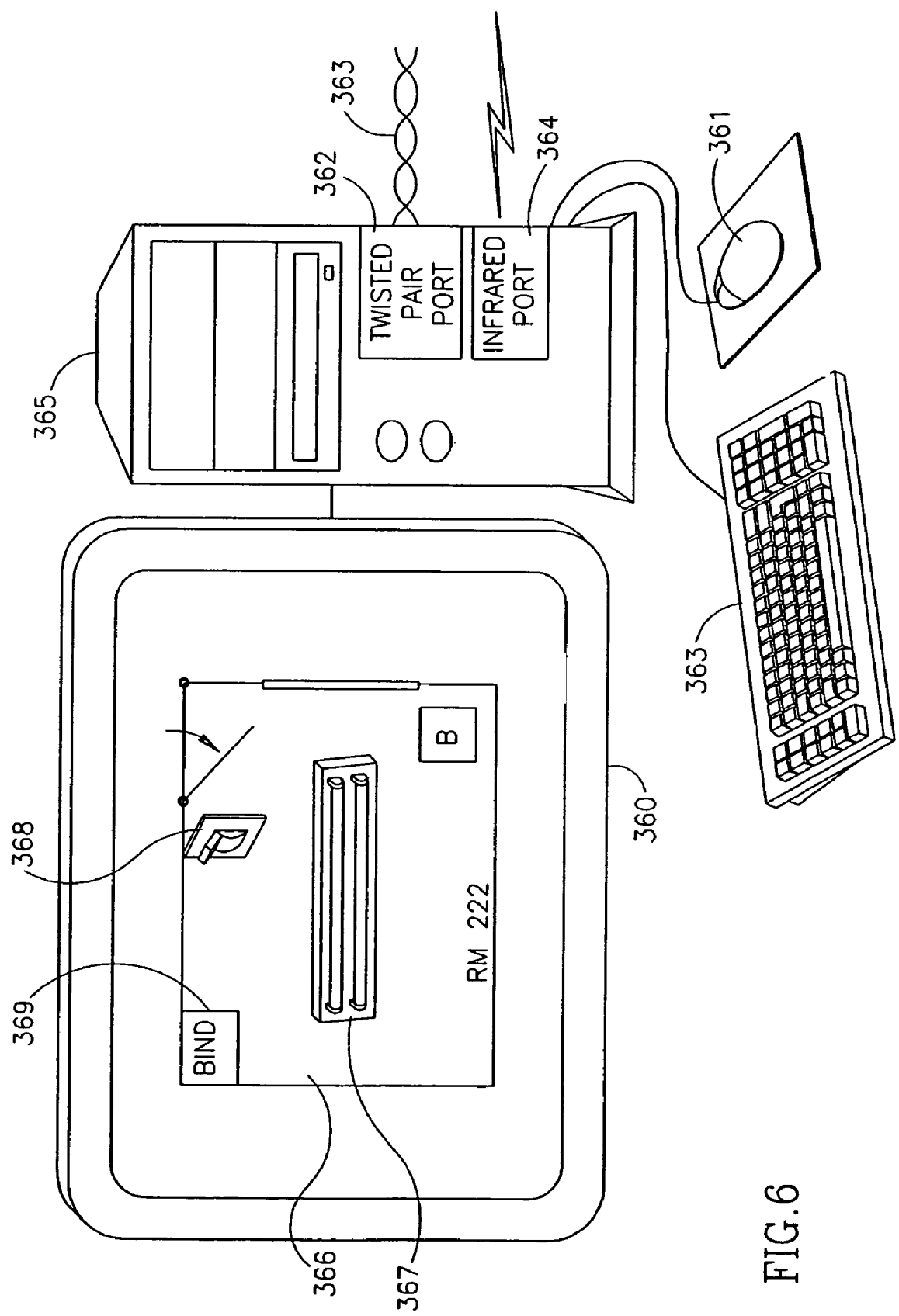
FIG. 6 is a diagram illustrating a third example of a network management tool constructed in accordance with the present invention comprising a personal computer.

A diagram illustrating a third example of a network management tool constructed in accordance with the present invention comprising a personal computer is shown in FIG. 6. This example management tool is built on a conventional PC platform adapted to perform to perform the binding method of the present invention. The tool comprises a conventional PC 365 including a processor, memory, keyboard 363, pointing device 361, display 360 and one or more I/O ports. The I/O ports comprise, for example, a bidirectional twisted pair communication port 362 and/or a bidirectional infrared communications port 364. The communication ports enable the tool to communication with devices remotely over a network.

In operation, a user uses the pointing device 361 to perform the binding operation. The user selects one or more device elements represented as icons on the screen to be included in the binding operation. In one embodiment, a floor plan of an office may be presented whereby the binding element icons are superimposed over the floor plan. This facilitates identifying the desired elements to bind. An example floor plan 366 is shown on the display and comprises the layout of an office containing a light switch 368 and fluorescent ballast 367. To effectuate the binding of the light switch 368 to the fluorescent ballast 367, the user simply selects the two elements by clicking on them and then clicks on the bind icon 369. The binding is then carried out in accordance with the binding method described in more detail hereinbelow. As described previously, the binding tool may be connected locally or remotely via a network. In the latter case, the binding commands are transmitted over the network via one of the communications I/O ports, e.g., the twisted pair port 362.

Figure 7:
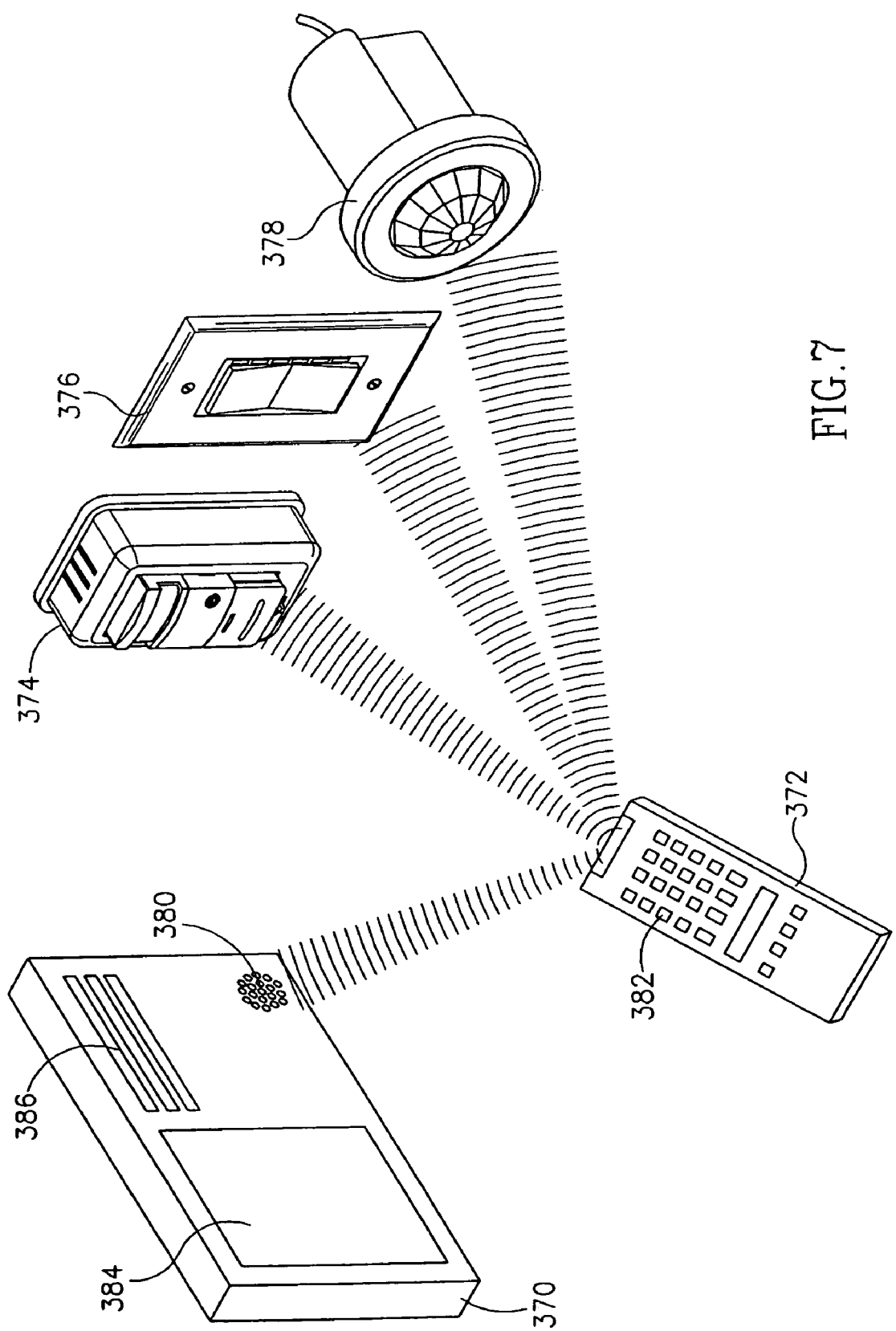
FIG. 7 is a diagram illustrating a remote installation tool interfacing with a network management tool in accordance with the present invention.

A diagram illustrating a remote installation tool interfacing with a network management station in accordance with the present invention is shown in FIG. 7. The network management tool 370 comprises a plurality of keys and/or buttons 386, display 384 and a bidirectional communication port 380 (for example, an IR port is shown). The remote installation tool 372 communicates with the network management station via the IR port 380. The installation tool comprises a plurality of buttons 382 for performing the install/binding process.

The installation tool also communicates with one or more devices to be installed into the automation or multimedia network. Examples illustrated include a multisensor device 374, an on/off dimmer with display 376 and a ceiling mount occupancy detector 378. To permit the installation tool to bind these devices into the network, these devices can be adapted to communicate via IR with the installation tool. Alternatively, they can be adapted to communicate with the management station over a network, e.g., twisted pair, RF, etc.

An alternative installation scheme to those described above is to include an 'install card' with each device whereby the information required for adding the device to the network is included in the card. A diagram illustrating a network management tool incorporating a magnetic card swipe means is shown in FIG. 8A. A diagram illustrating a network management tool incorporating a display screen, keyboard and magnetic card swipe means is shown in FIG. 8B. A diagram illustrating an example 'install' card including a magnetic strip and/or a machine-readable bar code is shown in FIG. 8C.

The network management controller 390 comprises a plurality of buttons, keyboard or keypad 396, a display 394 and a card reader 392. An alternative network management tool is shown FIG. 8B wherein the tool 400 comprises a plurality of buttons 402, keyboard or keypad 406, display 404 and a card reader 408. The keyboard 406 is adapted to drop down when in use and can be folded against the display when not in use to protect the display 404.

The install card, generally referenced 410, comprises the information required for adding the device to the network in machine-readable form. The information may be placed, for example, on a magnetic strip 414 or as a one or two-dimensional bar code 412. The install card would be included with each device. The install card contains all the necessary information required to add the device to the network. Such information includes but is not limited to the Neuron ID and program ID of the device, assuming a LonWorks type network. The network management tools 390, 400 are adapted to read the information encoded onto the install card. In the case when the install card comprises a magnetic strip, the network management tools 390, 400 are equipped with a magnetic card reader or magnetic swipe slot 392, 408, respectively.

Alternatively, the management tools are configured with bard code scanners in the case when the binding information is encoded as a bar code on the install card. Optionally, the install card may comprise a smart card. In this case, the management tools comprise means for reading smart cards.

The displays 394, 404 of each management tool are part of the user interface of each tool. The display may comprise any suitable type display such as an LCD. Optionally, the display may comprise a touch screen surface permitting users to enter data directly by touching the surface of the display. Further, the management tools may be fixed in location or can be mobile handheld units used by the installer (e.g., a homeowner).

A diagram illustrating an example handheld remote control installation tool is shown in FIG. 9A. The handheld installation tool shown may be used as the remote installation tool 372 shown in FIG. 7. The remote installation, generally referenced 420, comprises a plurality of keys and buttons 424 and a communications I/O port 422. For example, the communications port may comprise a USB, IR, RF or optical port. The example shown herein includes a USB port permitting the handheld device to easily interface with a PC or other network management tool. Depending on the application, a portion of the buttons or keys can be dedicated to the specific application. For example, considering a multimedia network, the handheld tool would comprise button for controlling video and audio sources, such as channel buttons, volume control, channel control, fast forward, play, rewind, etc.

In addition to the application specific buttons, the handheld tool also comprises a plurality of installation related buttons/keys. This is illustrated in FIG. 9B wherein the binding related controls are exposed to view. The binding related controls comprise a plurality of buttons and/or keys 426 for use during installation of a device to the network and for use during regular operation. Via the USB interface port, one or more keys of the handheld tool may be programmed. Buttons may be programmed to perform commands, such as retrieve status, security, display, turn on, turn off, all on, all off, execute custom application, etc.

Figure 10:
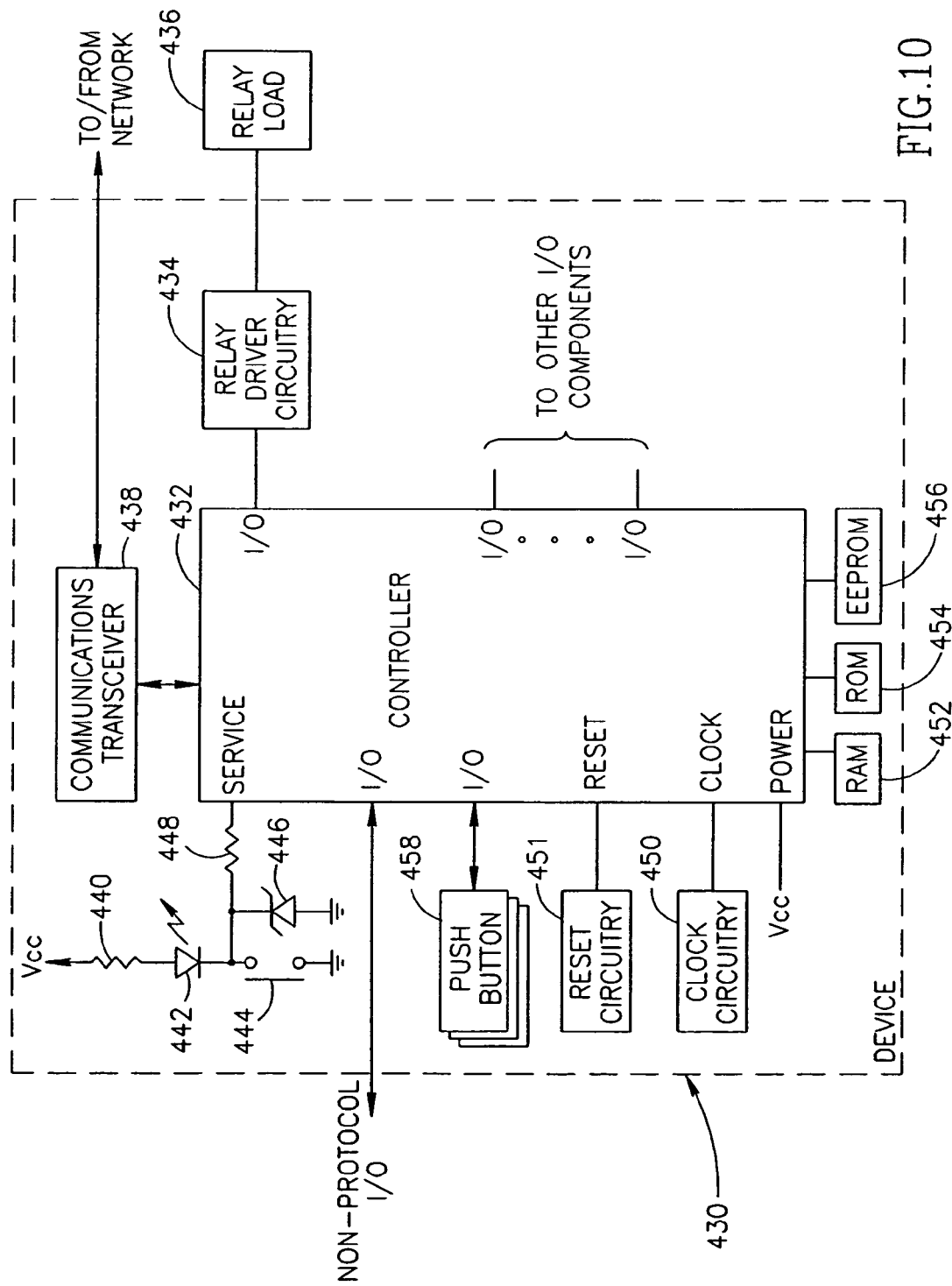
FIG. 10 is a block diagram illustrating in more detail an example device constructed in accordance with the present invention.

The structure of a typical device suitable for use with the methods of the present invention will now be described in more detail. A block diagram illustrating in more detail an example device constructed in accordance with the present invention is shown in FIG. 10. The device, generally referenced 430, can be adapted for various applications, one of which being lighting controls which is the example presented hereinbelow. Note, however, that one skilled in the art could apply the general structure of the device described herein to numerous other types of devices that target different electrical applications. The device shown in this example is adapted to control incandescent lighting loads or any other load that can be controlled via a relay. Devices adapted to function in other applications can also be constructed and are contemplated to be within the scope of this invention.

The device 430 comprises a controller 432 to which are connected various components including clock circuitry 450, reset circuit 451, communications transceiver 438, one or more pushbutton type switches 458 and relay driver circuit 434.

The controller comprises a suitable processor such as a microprocessor or microcomputer. For instance, in the context of a LonWorks compatible network, the controller may comprise a Neuron 3120 or 3150 microcontroller manufactured by Motorola, Schaumberg, Ill. More detailed information on the Neuron chips can be found in the Motorola Databook: "LonWorks Technology Device Data," Rev. 3, 1997. Memory connected to the controller includes RAM 452, ROM 454 for firmware program storage and EEPROM 456 for storing downloadable software and various constants and parameters used by the device.

A power supply (not shown) functions to supply the various voltages needed by the internal circuitry of the device, e.g., 5 V ($V_{CC}$), 15 V, 24 VAC, etc. In addition to the internal power needs, the power supply may provide a supply voltage for external devices to use. For example, 15 V can be provided to a plurality of external devices for powering their circuitry. This reduces the complexity of external devices such as sensors, thus reducing their cost by eliminating the requirement of having a power supply onboard.

A clock circuit 450 provides the clock signals required by the controller 432 and the remaining circuitry. The clock circuit may comprise one or more crystal oscillators for providing a stable reference clock signal. A reset circuit 451 provides a power up reset signal to the controller 432.

In the case of LonWorks compatible networks, the device 430 comprises a service pin to which is connected a momentary push button switch 444 and service indicator 442. The switch 444 is connected between ground and the cathode of the LED 442. The anode of the LED is connected to $V_{CC}$ via resister 440. A zener diode 446 clamps the voltage on the service pin to a predetermined level. The switch 444 is connected to the service pin via a series resister 448. The service pin on the controller functions as both an input and an output. The controller 432 is adapted to detect the closure of the switch 444 and to perform service handling in response thereto. A more detailed description of the service pin and its associated internal processing can be found in the Motorola Databook "LonWorks Technology Device Data" referenced above.

The device 432 interoperates with other devices on the network. The communication means comprises a communication transceiver 438 that interfaces the controller 432 to the network. The communications transceiver may comprise any suitable communication or network interface means. The choice of network, e.g., LonWorks, CEBus, etc. in addition to the choice of media, determines the requirements for the communications transceiver. Using the LonWorks network as an example, the communications transceiver may comprise the FTT-10A twisted pair transceiver manufactured by Echelon Corp, Palo Alto, Calif. This transceiver comprises the necessary components to interface the controller to a twisted pair network. Transmit data from the controller is input to the transceiver which functions to encode and process the data for placement onto the twisted pair cable. In addition, data received from the twisted pair wiring is processed and decoded and output to the controller. Transceivers for other types of media such as power line carrier and coaxial, for example, can also be used.

As described above, the control unit also comprises means for controlling various lighting loads. In the example shown here, the device may control any electrical device that can be controlled via a relay. Relay loads are controlled by the relay driver circuit 100, via a RELAY signal generated by the controller.

In addition, external devices that do not implement a protocol can be tied into the network via the Non-Protocol I/O connection to the controller. Thus, non-protocol I/O devices can be controlled and can share information with other protocol enabled devices. This enables low cost non-protocol devices to be tied into the network thus providing an optimized system solution.

The device is added to the network using the binding method of the present invention. The binding may be effectuated using various means such as the one or more pushbutton switches 458 coupled to the controller through I/O ports or by software means by a network management tool located remotely on the network. In the latter case, the binding is effected via messages transmitted over the network and received by the controller via the communications receiver 438.

LonWorks Automated Binding Process

Figure 11:
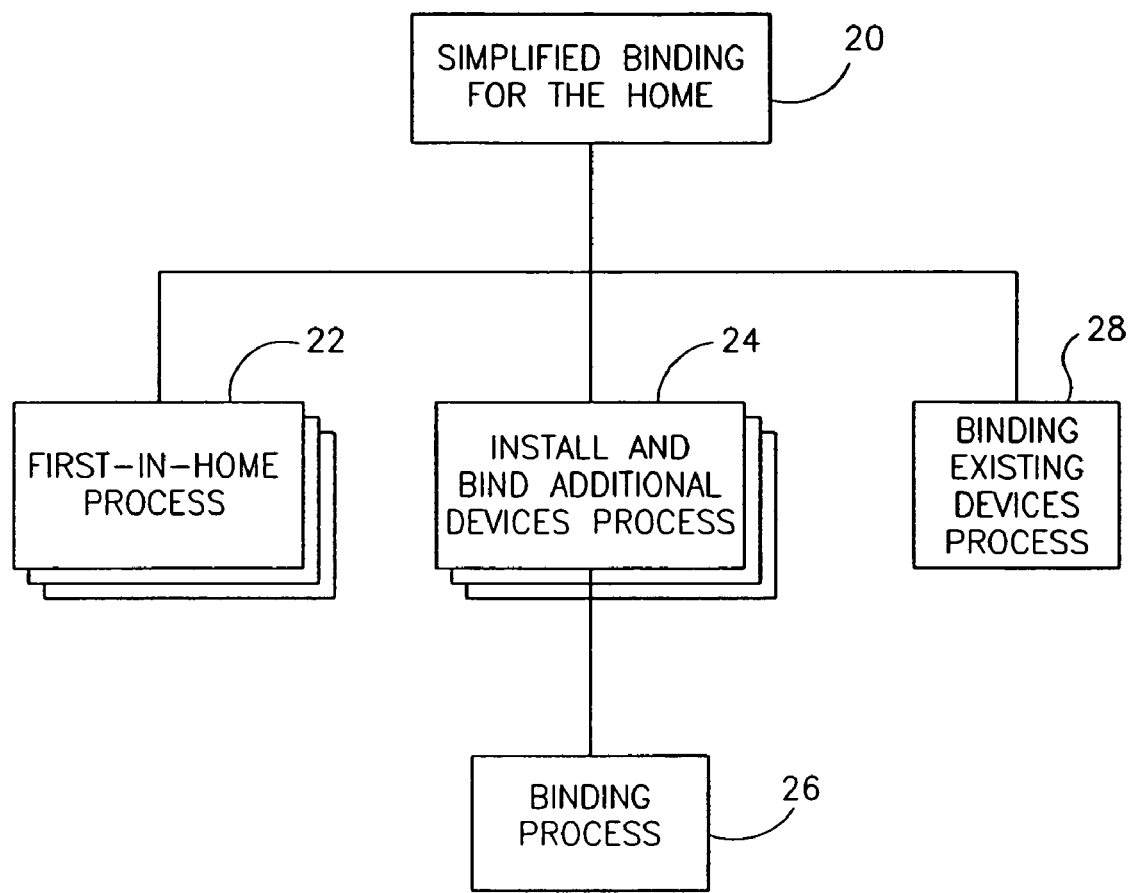
FIG. 11 is a diagram illustrating a high level view of the various potential binding processes for the home, industrial or commercial environments.

A diagram illustrating a high level view of the various potential binding processes for the home, industrial or commercial environments is shown in FIG. 11. For illustration purposes, the binding method 20 is presented within the context of a home environment as the number of users that can potentially enjoy the advantages of the present invention are the greatest in this group. The binding method presented, however, is suitable for use in industrial and commercial environments as well.

The binding method is divided into three categories. The first category includes the first-in-home process 22 whereby a device to be installed and bound is the first device to be placed in the home network. The second category is the installation and binding of additional devices 24 which also includes the binding process 26 itself. The third category includes the method of binding existing devices 28. Each process will be discussed in more detail beginning with the first-in-home process 22.

It is important to note that in accordance with the present invention the process of binding a device to the network can be performed in a variety of ways. The binding can be performed locally via (1) means on the device itself such as one or more pushbuttons or (2) an external binding tool connected to the device via a hardwired or wireless connection (e.g., IR, RF, optical, etc. Alternatively, the binding may be performed remotely via a network such as a WAN, LAN, Internet, etc. In this case, the device is adapted to comprise the necessary means of communicating over the specific type of network.

Figure 12A:
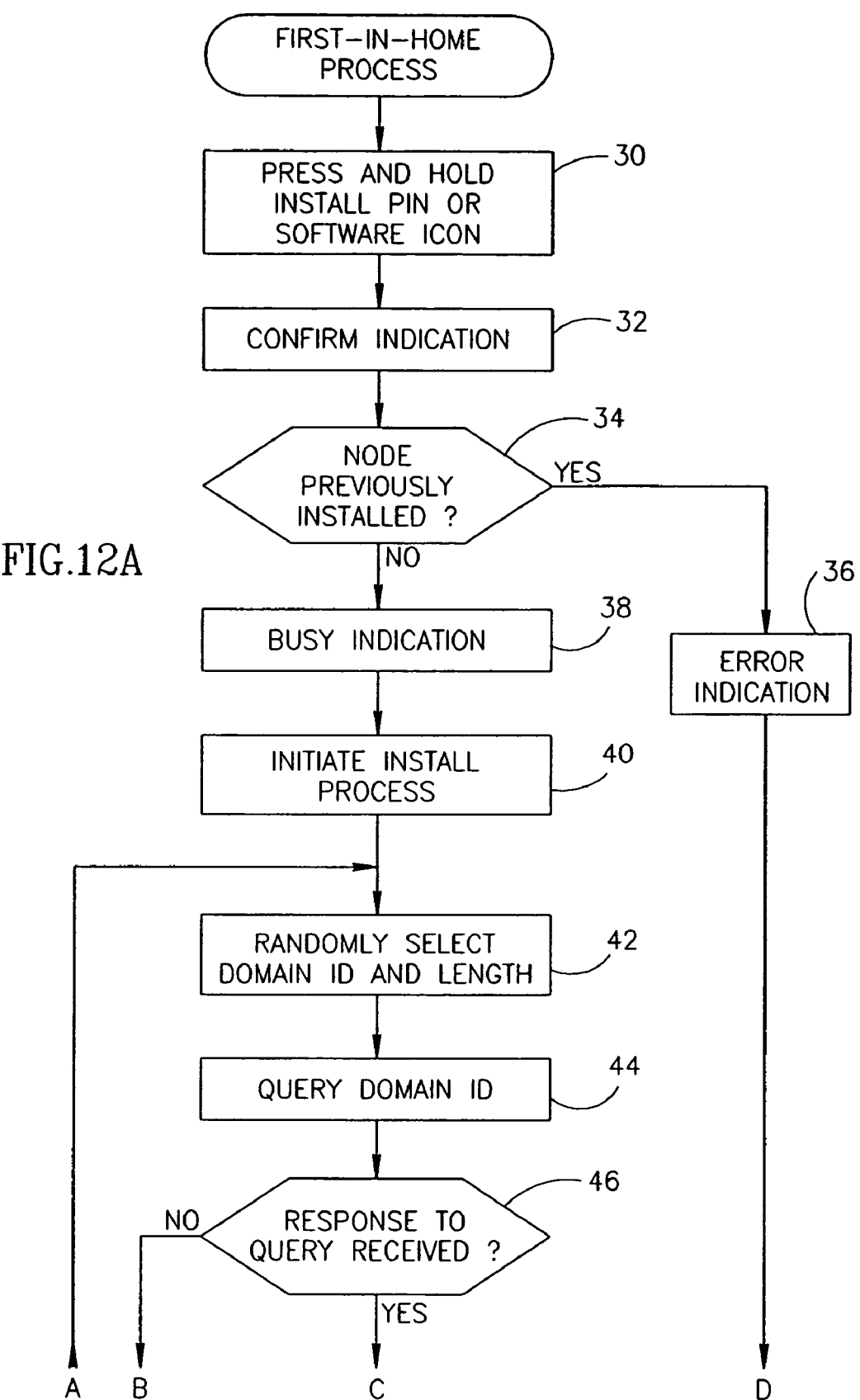
FIGS. 12A and 12B are a flow diagram illustrating the first-in-home process portion of the method of the present invention.
Figure 12B:
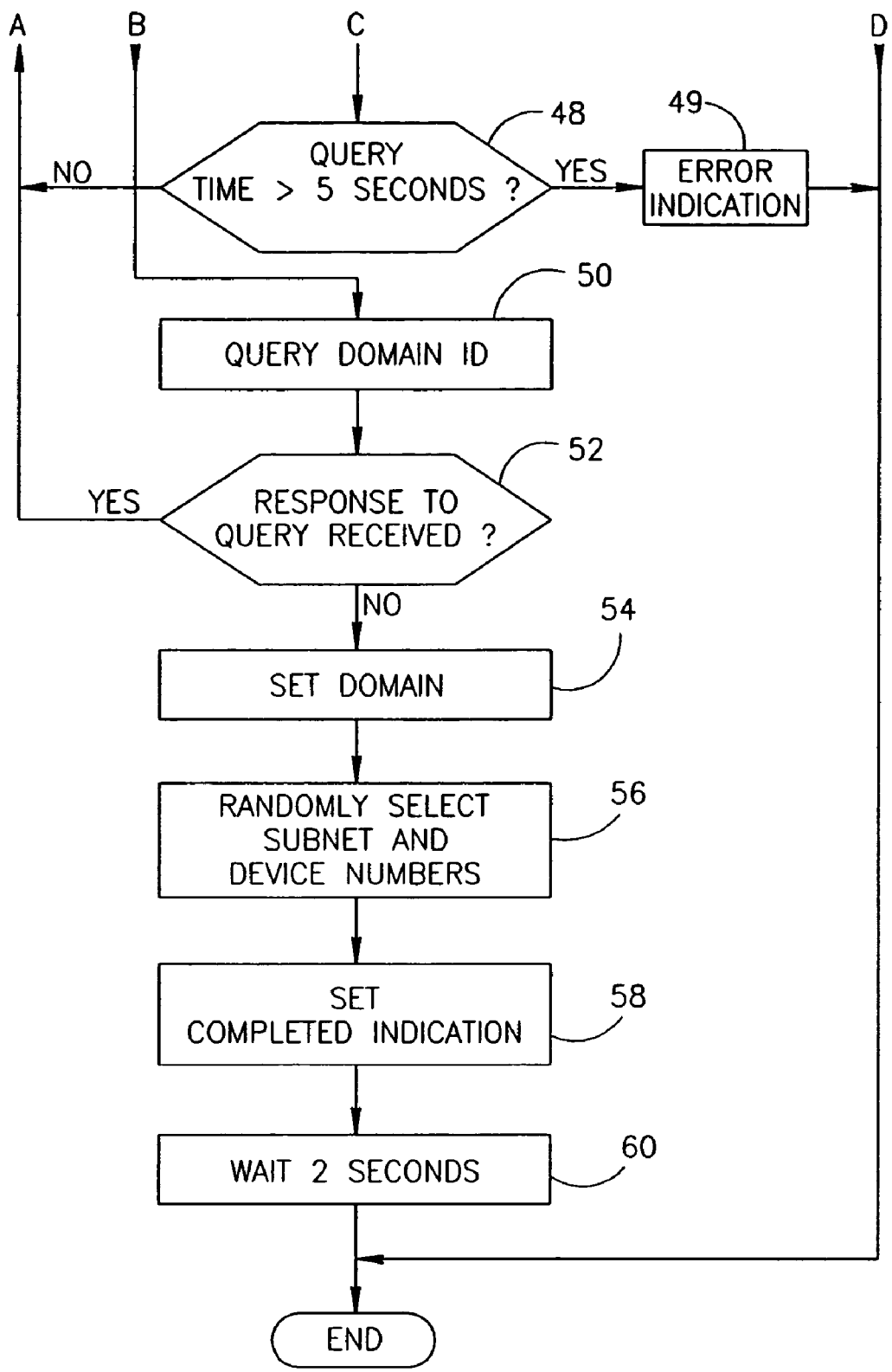

A flow diagram illustrating the first-in-home process portion of the method of the present invention is shown in FIGS. 12A and 12B. Initially, a user obtains a networked product and wires it into the home network (electrical and communications). Once installed, the user presses and holds the install pin for a period of time, e.g., 3 seconds (step 30). It is important to note that throughout this document a reference to pressing a pushbutton switch denotes either (1) pressing a conventional pushbutton type switch, (2) actuating any suitable mechanical or electromechanical type switch, (3) conveying the equivalent of a button press via software means, (4) conveying the equivalent of a button press via network means, or (5) any combination of the above.

The confirm indicator is then set to yellow and steady on so as to alert the user that the device, i.e., networked device, has confirmed the input from the user and that the device is in the installation mode of operation. (step 32). It is then checked to see whether the device was previously installed (step 34). If so, an error indicator is set to red and blinking three times in a row so as to signify that the user has performed an illegal function (step 36). Subsequently, the device returns to normal operating conditions.

If the device was not previously installed, a busy indicator is set to green and flashing (step 38) so as to signify that the mode is valid and is in the process of performing the requested function (step 40). In next step, the device randomly selects a domain length and a domain ID (step 42). The device then queries the network on the selected domain (step 44). If a response is received (step 46) it is checked whether a predetermined period of time has been exceeded (step 48). The steps of querying are repeated for a finite amount of time, e.g., 5 seconds. If the allotted time has not been exceeded, the device selects another domain length and domain ID (step 42) and starts the query again (step 44).

If the maximum time period has been exceeded an error indication is set to red and a solid on to alert the user that the binding process cannot continue and that user intervention is required (step 49). In this case, the device does not return to normal operating condition.

If no response is received from the query, the device queries the network a second time using the selected domain length and domain ID within a time period, e.g., 0.5 second (step 50). If a response arrives (step 52) the query process starts again. If no response is received, the domain is valid and the domain is set within the device (step 54). A Subnet and a Device Number are then randomly chosen (step 56). The indicator is set to green and solid on to indicate that the process is complete (step 58). The device then waits two seconds (step 60) before returning to normal operating procedure.

Figure 13A:
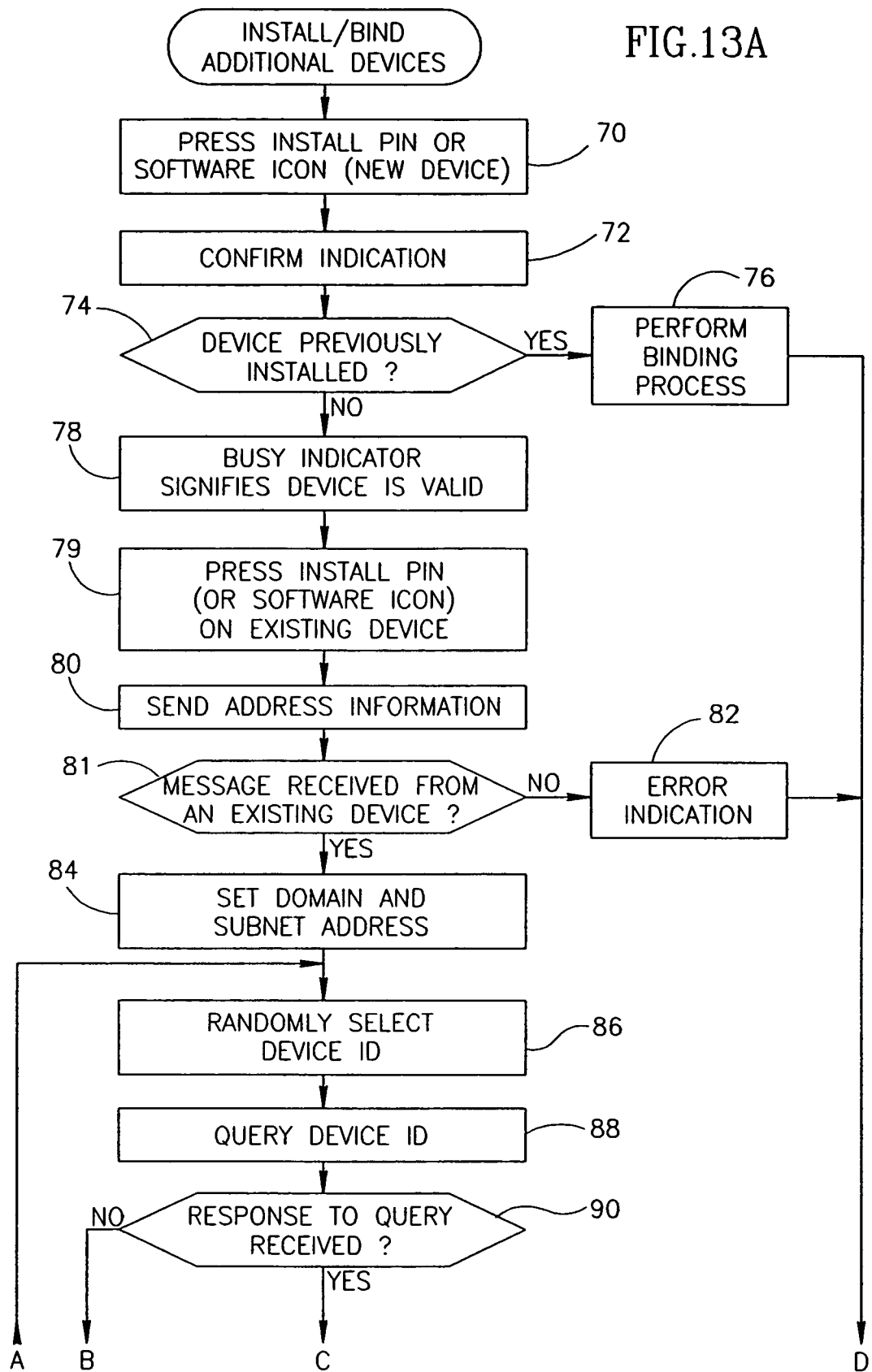
FIGS. 13A and 13B are a flow diagram illustrating the install and bind additional devices process portion of the method of the present invention.
Figure 13B:
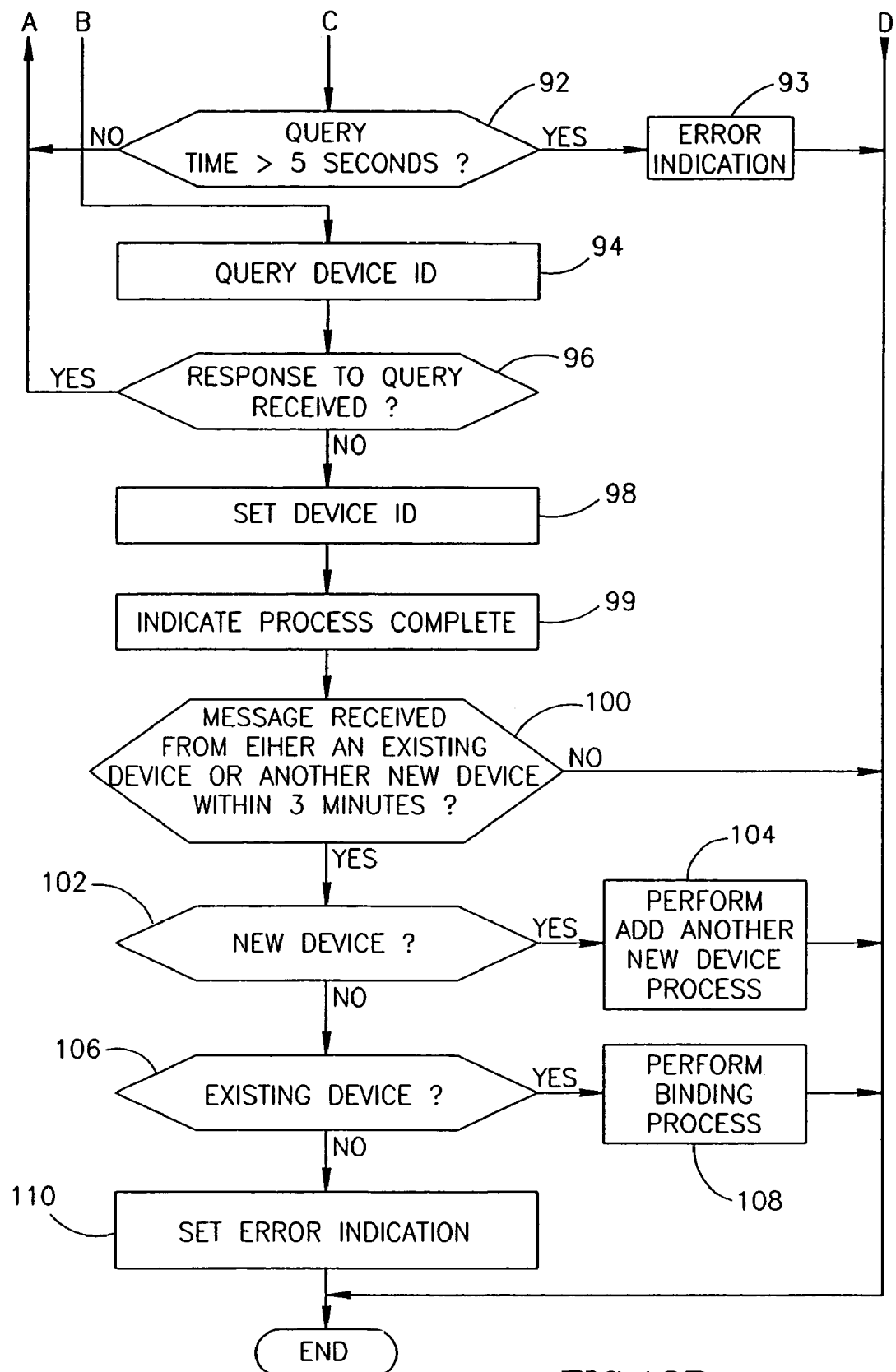

A flow diagram illustrating the install and bind additional devices process portion of the method of the present invention is shown in FIGS. 13A and 13B. The first step is the user pressing the install pin on a new device (step 70). The confirm indicator is set to yellow and solid on to signify that the device has confirmed the command from the user (step 72). The device then checks to see if it was previously installed (step 74). If so, the device requires binding and control is transferred to the binding process (step 76) (flow diagram in FIG. 15). If the device was not previously installed, a busy indicator is set to green and flashing to signify that the mode is valid and that the function is being performed (step 78).

The device then waits for a message to be received from another device. At this point, the user presses the install pin on an existing device somewhere within the network (step 79). This must happen within a limited time period, e.g., 3 minutes. The existing device then places address information onto the network and its confirmation indicator is set to yellow and solid on (step 80). If the device being installed does not receive the message (step 81), an error indication is set to red and blinking three times in a row so as to alert the user that an illegal function has been performed (step 82). The device then returns to normal operating condition.

If the device being installed from the existing device receives a message, the device then updates its domain and subnet address information in accordance with the information received from the existing device (step 84). The device then randomly selects another device ID (step 86) and starts a query (step 88). If a response is received (step 90) it is checked whether a predetermined period of time has been exceeded (step 92). The steps of querying are repeated for a finite amount of time, e.g., 5 seconds. If the allotted time has not been exceeded, the device selects another device ID (step 86) and starts the query again (step 88).

If the maximum time period has been exceeded an error indication is set to red and a solid on to alert the user that the binding process cannot continue, a valid device ID cannot be found and that user intervention is required (step 93). In this case, the device does not return to normal operating condition.

If no response is received from the query, the device queries the network a second time using the selected domain length and domain ID within a time period, e.g., 0.5 second (step 94). If a response arrives (step 96) the query process starts again with step 86. If no response is received, the device ID is valid and the device ID is set within the device (step 98). The indicator is set to green and solid on to indicate that the process is complete (step 99).

The device then waits a time period, e.g., three minutes, for a message from either an existing device or another new device (step 100). The act of pressing the install pin on either another new device or an existing device sets the confirm indicator thereon to yellow and solid on. If a message is received, the device checks the message to determine whether it is a new device (step 102) or an existing device (step 106). If the message is from a new device, the process to add another new device is performed (step 104) (see flow diagram in FIG. 14). If the message is from an existing device, the binding process is performed (step 108) (see flow diagram in FIG. 15).

If no message is received within three minutes, an error indication is set to red and blinking three times in a row so as to alert the user that an illegal function has been performed (step 110). The device then returns to normal operating condition.

Figure 14:
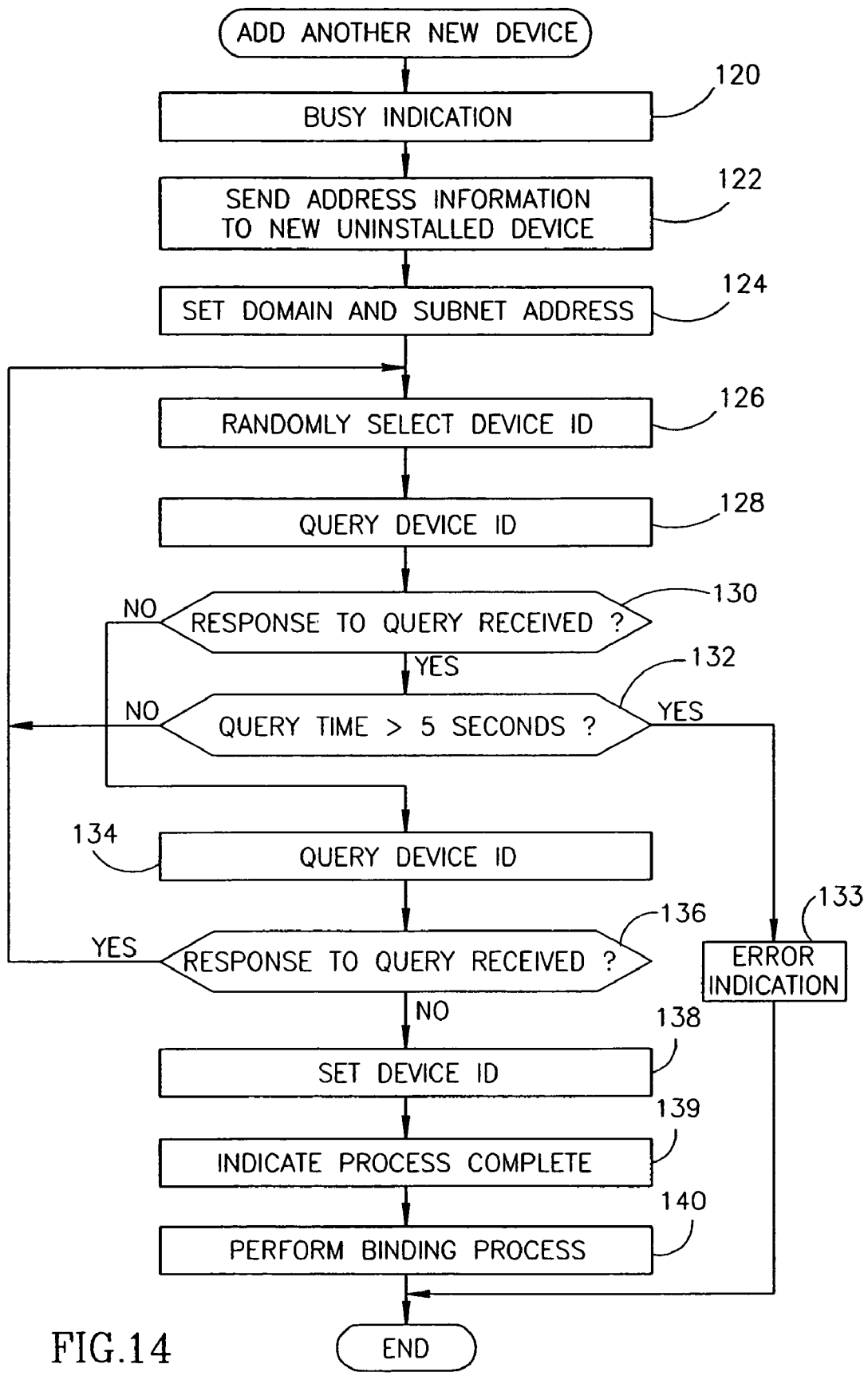
FIG. 14 is a flow diagram illustrating the add another new device process portion of the method of the present invention.

A flow diagram illustrating the add another new device process portion of the method of the present invention is shown in FIG. 14. The add another new device process begins with the busy indicator set to green and flashing to signify that the mode is valid and is in the process of performing the requested function (step 120). The newly installed device (that now exists) sends address information to the new uninstalled device (step 122). The new uninstalled device updates its domain and subnet address information in accordance with the information received from the existing device (step 124). The new uninstalled device then randomly selects a device ID (step 126) and queries the network for the device ID (step 128).

If a response is received (step 130) it is checked whether a predetermined period of time has been exceeded (step 132). The steps of querying are repeated for a finite amount of time, e.g., 5 seconds. If the allotted time has not been exceeded, the device selects another device ID (step 126) and starts the query again (step 128).

If the maximum time period has been exceeded an error indication is set to red and a solid on to alert the user that the binding process cannot continue, a valid device ID cannot be found and that user intervention is required (step 133). In this case, the device does not return to normal operating condition.

If no response is received from the query, the device queries the network a second time using the selected domain length and domain ID within a time period, e.g., 0.5 second (step 134). If a response arrives (step 136) the query process starts again with step 126. If no response is received, the device ID is valid and the device ID is set within the device (step 138). The indicator is set to green and solid on to indicate that the process is complete (step 139). The binding process is then performed (step 140) (see flow diagram in FIG. 15).

Figure 15:
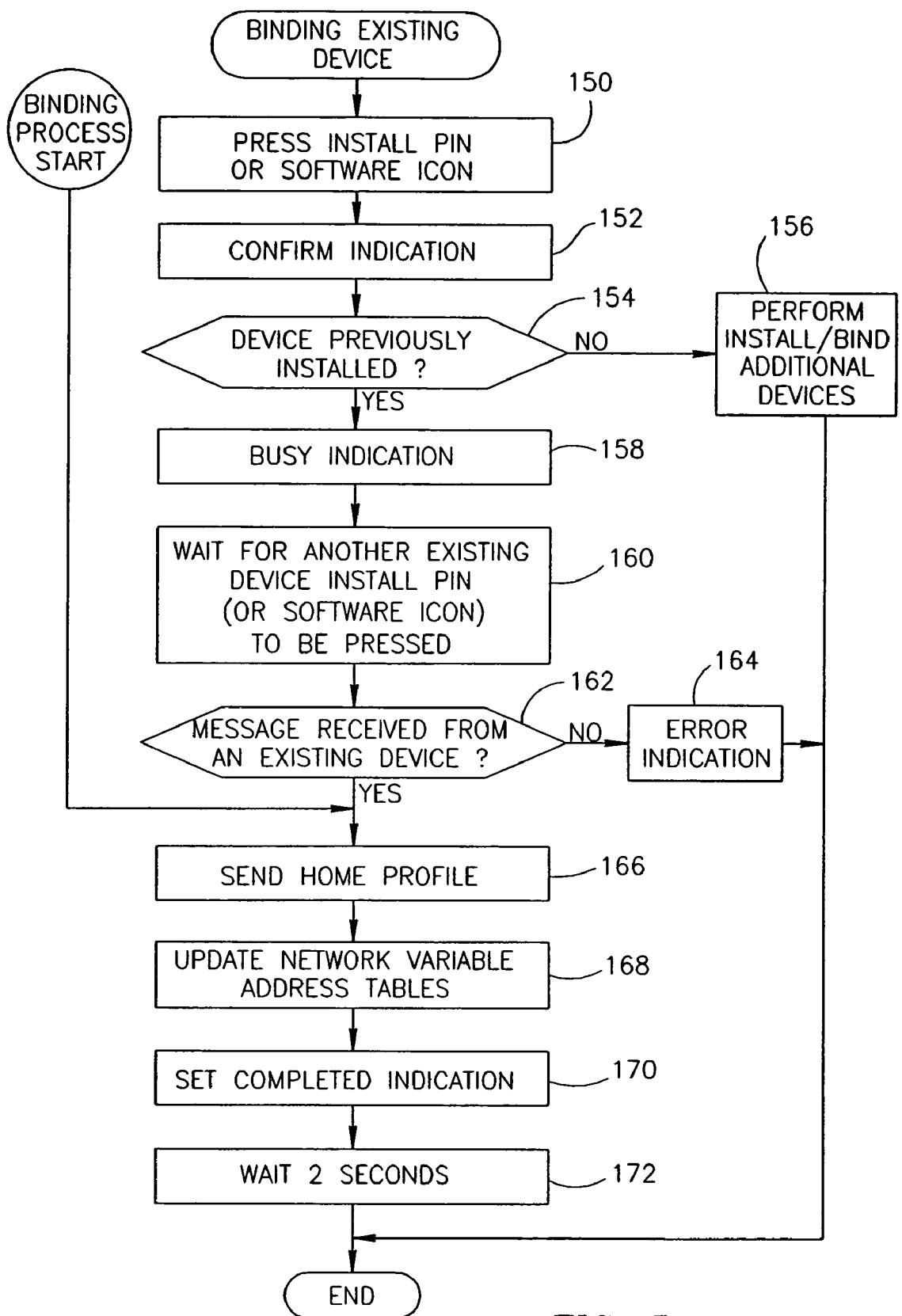
FIG. 15 is a flow diagram illustrating the binding existing devices and binding processes portion of the method of the present invention.

A flow diagram illustrating the binding existing devices and binding processes portion of the method of the present invention is shown in FIG. 15. The first step is a user presses the install pin on an existing device (step 150). The confirm indication is set to yellow and solid on to signify that the device has confirmed the input from the user (step 152). The device then checks to see whether it was previously installed (step 154). If the device was previously installed, a busy indicator is set to green and flashing to signify that the mode is valid and is in the process of performing the requested function (step 158). If the device was not previously installed, the device is a new device and must be installed first. Control is passed to the install and bind additional devices method (step 156) (see flow diagram in FIGS. 13A and 13B).

If the device was previously installed, the device then waits for the install pin on another existing device to be pressed (step 160). The device waits for a certain period of time, e.g., 3 minutes. If no message is received within the time period (step 162), the error indicator is set to red and blinks three times in a row repeatedly to signify that the user has performed an illegal function (step 164). The device then returns to normal operating procedures.

If the user presses the install pin on another existing device within three minutes, the device then performs the binding process as follows. The binding process begins with the devices sending a Home Profile message to each other with the option to bind all application variables, otherwise only the mandatory variables are bound (step 166). Next, the devices update their respective network variable address tables in accordance with the optional Home Profile received (step 168). If an object does not have Home Profile explicit messaging, then the method defaults to binding only the mandatory variables. The device being installed then indicates a completed process by setting its indicator to green and solid on (step 170). The device then waits two seconds before returning to normal operating procedure (step 172).

Figure 16:
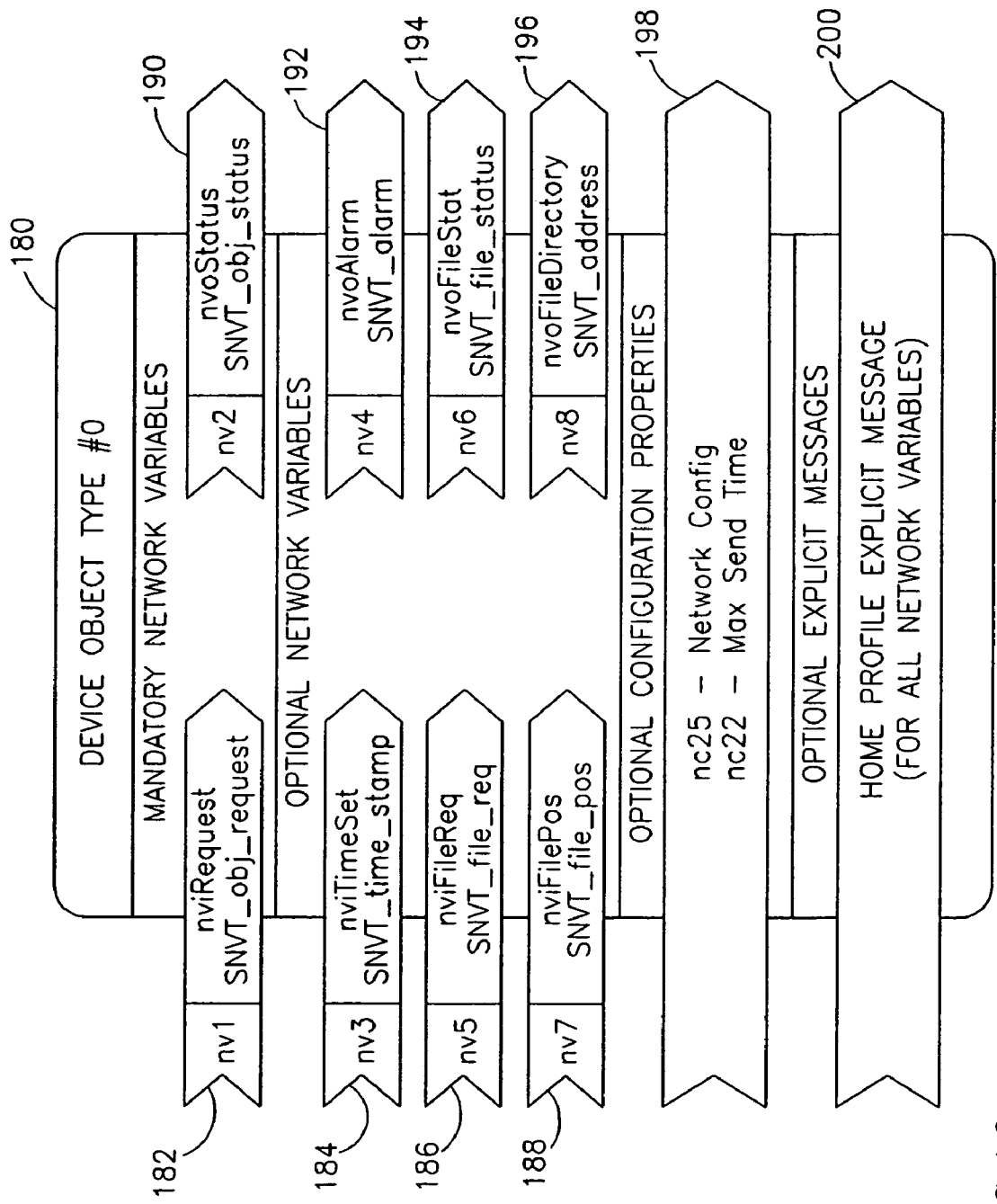
FIG. 16 is a diagram illustrating the network variables and configuration parameters of the device object associated with a Functional Profile for a Home Device.

A diagram illustrating the network variables and configuration parameters of the device object associated with a Functional Profile for a Home Device is shown in FIG. 16. This Device Object, generally referenced 180, includes the mandatory and optional network variables, optional configuration properties and optional explicit messages that make up a Home Profile for binding all variables. The device object shown is suitable for use with LonWorks compatible devices and networks. It is appreciated that one skilled in the art could derive analogous device objects for other systems as well.

The mandatory network variables comprise an input Request 182 and output Status 190. The optional network variables comprise an input Time Set 184, input File Request 186, input File Position 188, output Alarm, output File Status 194 and output File Directory. Optional configuration parameters 198 comprise Network configuration and Maximum Send Time. Optional explicit messages 200 comprise a Home Profile explicit message to bind all network variables (i.e., mandatory, optional or manufacturer's optional).

In accordance with the invention, not all the devices in an automation or multimedia network need perform the method of the present invention. Devices that do perform the binding method of the invention can interoperate with devices that do not. Devices that do not have the binding capability of the invention can bind utilizing traditional binding techniques.

CEBus Automated Binding Process

The automated binding method described hereinbelow is suitable for use with CEBus compatible devices and networks. All devices must be able to communicate bidirectionally, as the protocol described below required that all providers verify that messages get through to connected listeners. Broadcast messages are used only to speed up the end-to-end response time. It is suggested that all DLL layer communications be performed using unacknowledged service. This permits the DLL interface IC to be as inexpensive as possible. In addition, 'group' addresses are not limited by the DLL IC, since all received packets are passed to the host processor.

Each context within each device is assigned a unique 16-bit context number. The number effectively replaces the unit address. Thus, if a device contains 3 provider contexts and 2 listener contexts, the device will response to 5 different unit addresses, in addition to the CEBus broadcast address 0 and optionally the Hpnp broadcast address FFFF. The universal context can be referenced in all context numbers. The universal context holds a list of all context numbers the device contains.

Group broadcasts from a provider context in a device are sent to the context number of the provider's context. During connection procedures (formerly termed binding) a listener records the context number of each provider context which it will obey. Similarly, a provider context records the context number of each listener context it will control. At run time, the provider context makes a broadcast to itself when a message is to be sent to the entire group. All the listener contexts in the group act upon the message. Immediately after the broadcast, the provider context sends an individual message to each listener context in turn, incurring that each listener has received the message. This technique ensures both fast response time and communications integrity.

The user interface of the method will now be described in more detail. Note that the user interface presented below is oriented towards home automation products. One skilled in the art could, however, adapt the user interface for use with other systems as well, e.g., LonWorks or any other bidirectional home automation protocol.

A single button and single LED or other indicator are needed (see FIG. 2) for each independent functions in the device. In cases where several different functions exist in a single device, the single button and LED may be shared, provided a clear means of selecting which function they currently apply to is provided. Thus, in one embodiment, a five button lighting panel with 5 indicator lamps may have an additional 5 buttons and 5 LEDs, or may have a switch labeled Hpnp/Run, allowing the existing buttons and indicators to be used in Hpnp mode. Alternatively, the five-button panel device may comprise an additional button and LED along with a thumbwheel to indicate which button they apply to.

A long push is required to activate the interface on any device. A long push lasts a relatively long time, e.g., 8 seconds or longer. After 8 seconds has elapsed, the LED becomes steadily lit if it was previously out of blinking, or vice versa if it was previously lit. This indication remains only until the button is released, whereupon the indication becomes one of the indications listed below.

Other pushes have no minimum duration, but polling the button at 25 msec. or faster is sufficient. Release must last 200 msec. or longer before the software can detect another push. To allow for multi-push commands, 2 seconds of release indicates that the user has finished entering the multi-push command.

The commands and indications of the method will now be described in more detail.

Note that since the user applies to a context rather than a device, the description below, refers to contexts and not devices in connection with commands or the display of indications. Table 1 below lists the commands and Table 2 lists the indications.

TABLE 1

Commands

| Command | Description |
| --- | --- |
| Long Push | Activate interface |
| 1 Push | Stop |
| 2 Pushes | Identify House |
| 3 Pushes | Connect |
| 4 Pushes | First In House |
| 5 Pushes | Factory Defaults |

TABLE 2

Indications

| Indication | Description |
| --- | --- |
| Slow Blink | Out Of Box |
| Fast Blink | Error |
| Double Blink | Identifying House |
| Triple Blink | Connecting |
| Quad Blink | Hunting |
| Lit | In House |
| Out | Ready |

The STOP command aborts any command being executed. It is also used to cancel an ERROR indication. After the STOP command, the context returns to its normal state. This state will either be OUT OF BOX, IN HOUSE or READY.

The FACTORY DEFAULTS command resets the non-volatile memory in the context to its OUT OF BOX state. There is no ERROR indication possible for this command. This command must be used to remove listener context numbers from a provider's connection list, or to remove provider context numbers from a listener's connection list.

The FIRST IN HOUSE command causes the context to choose a new house code at random and to ensure that no device exists on that house code. While hunting for a house code, the context indicates HUNTING. When a new house code is chosen, the context selects a unit address at random, then indicates IN HOUSE. ERROR is indicated if the context was not in its OUT OF BOX state when the command was issued, or if hunting for a new house code fails after 10 minutes of attempts.

The IDENTIFY HOUSE command instructs the context to provide its house code to any context that asks for it. This state is indicated by IDENTIFYING HOUSE and continues until 10 minutes have passed during which no other context asks for the house code. In identify house mode, the context answers house code hails on house code 0 unit address 0. The IDENTIFY HOUSE command causes an ERROR indication if: (1) the context has not learned its house code or unit address or (2) another context is already supplying the house code. To determine whether another context is answering house code hails, the context receiving the command hails three times. Note that to handle a house containing only one provider and one listener, provider contexts must respond to house code hails while in connecting mode. In such cases, CONNECTING is indicated.

The CONNECT command tells the context to join the group being formed. The group can have only a single provider, but may have one or more listeners. Note that the CONNECT command always adds a connection. A connection is removed using the FACTORY DEFAULTS command. The CONNECT command is first issued to the provider (which enters CONNECTING mode), then to each listener in turn (which succeed or fail in a short time, e.g., seconds).

SLOW BLINK indicates a context is in its OUT OF BOX state. The LED is on 500 msec. and off 500 msec. This indication is shown except when the context has knowledge of both its house code and unit address.

FAST BLINK indicates an error has occurred with the last command. The LED is on 125 msec. and off 125 msec. This indication persists forever until the context is powered down, reset or another command is entered.

DOUBLE BLINK indicates the context is in IDENTIFYING HOUSE mode. This LED is on 250 msec. and out 250 msec, repeats then is out for 1 second. This indication (also mode) remains up until 10 minutes passes during which no other context asks for the house code. Note that if a context in identifying house mode is then placed into connecting mode, CONNECTING alone is indicated.

TRIPLE BLINK indicates that the context is in CONNECTING mode. The LED is on 250 msec and out 250 msec, repeating both twice, then is out for 1 second. Connecting mode only applies to providers. This indication (also mode) remains up until 10 minutes have passed during which no listeners ask to connect to the context.

QUADRUPLE BLINK indicates that the context is in HUNTING mode. The LED is on 250 msec. and out 250 msec, repeating both thrice and then out for 1 second. Hunting mode applies to both providers and listeners whenever either attempts to find a house code supplier or to choose their own unit address. It also applies to listeners when they are trying to find a connecting provider.

The LED being illuminated indicates that the context is in IN HOUSE mode. This means that the context knows both its house code and its unit address.

The LED being off indicates that the context is in READY mode. This means that the context knows its house code and unit address and has also established at least one connection to a provider or a listener.

Figure 17:
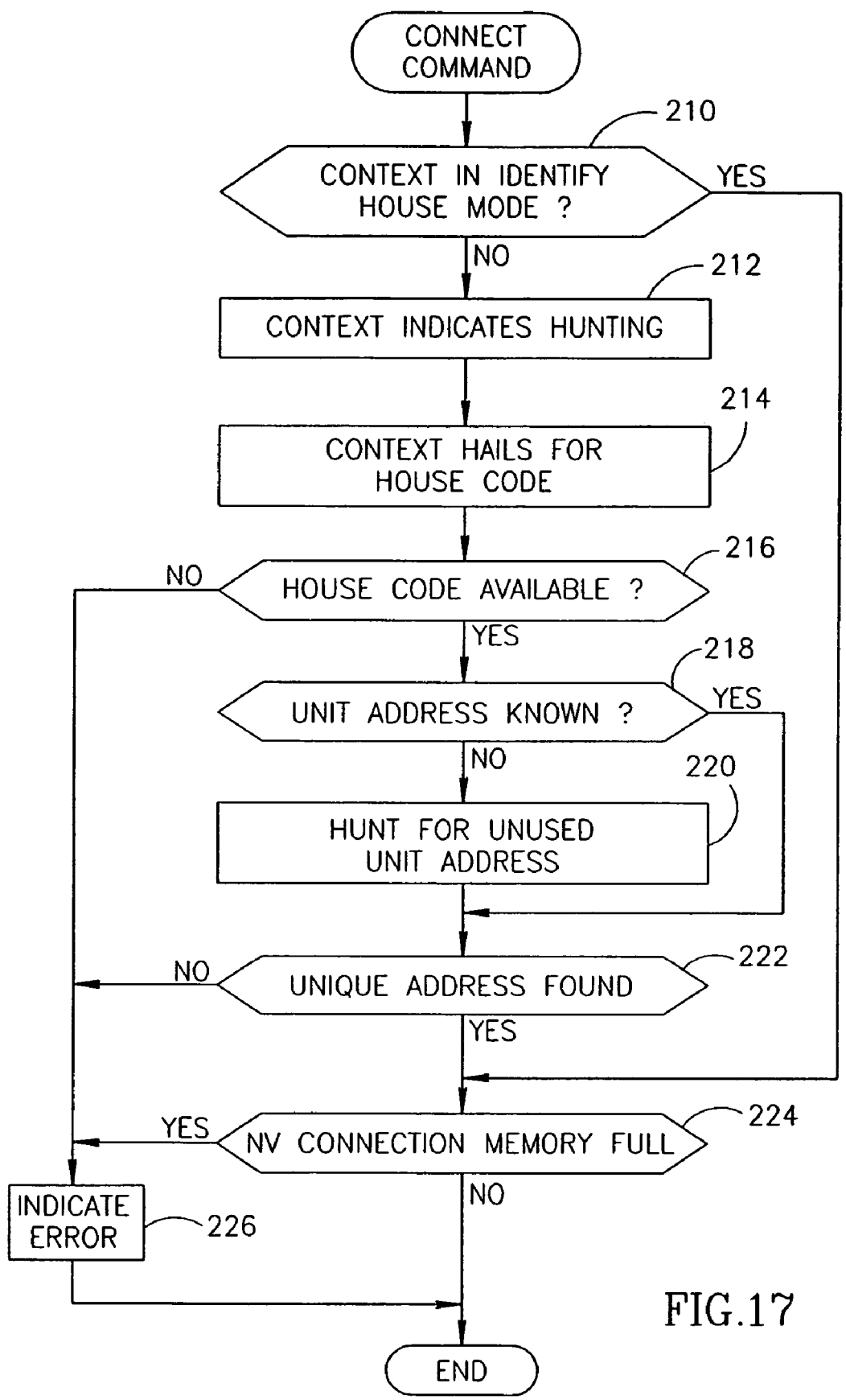
FIG. 17 is a flow diagram illustrating the connect command portion of the CEBus compatible binding method of the present invention.

A flow diagram illustrating the CONNECT command portion of the binding method of the present invention is shown in FIG. 17. When the CONNECT command is issued to any context, the first step is to check whether the context is in identify house mode (step 210). If so, control passes to step 224. If not, the context indicates HUNTING (step 212). The context then hails for the house code up to three times (step 214). Hail packets are sent to the house code 0 unit address 0. ERROR is indicated if no context supplies a house code (step 216) or if the house code differs from its own (step 226).

If the context does not know its unit address (step 218), the context hunts for an unused unit address by choosing addresses at random and hailing up to three times to determine if it is use (step 220). If a unique address is not found (step 222) within 10 minutes of hunting, ERROR is indicated (step 226). If the context has no room remaining in its non-volatile connection memory (step 224), ERROR is indicated (step 226). Note that is the context does not know both its house code and unit address, it is not 'in the house' and must both while connecting.

Figure 18:
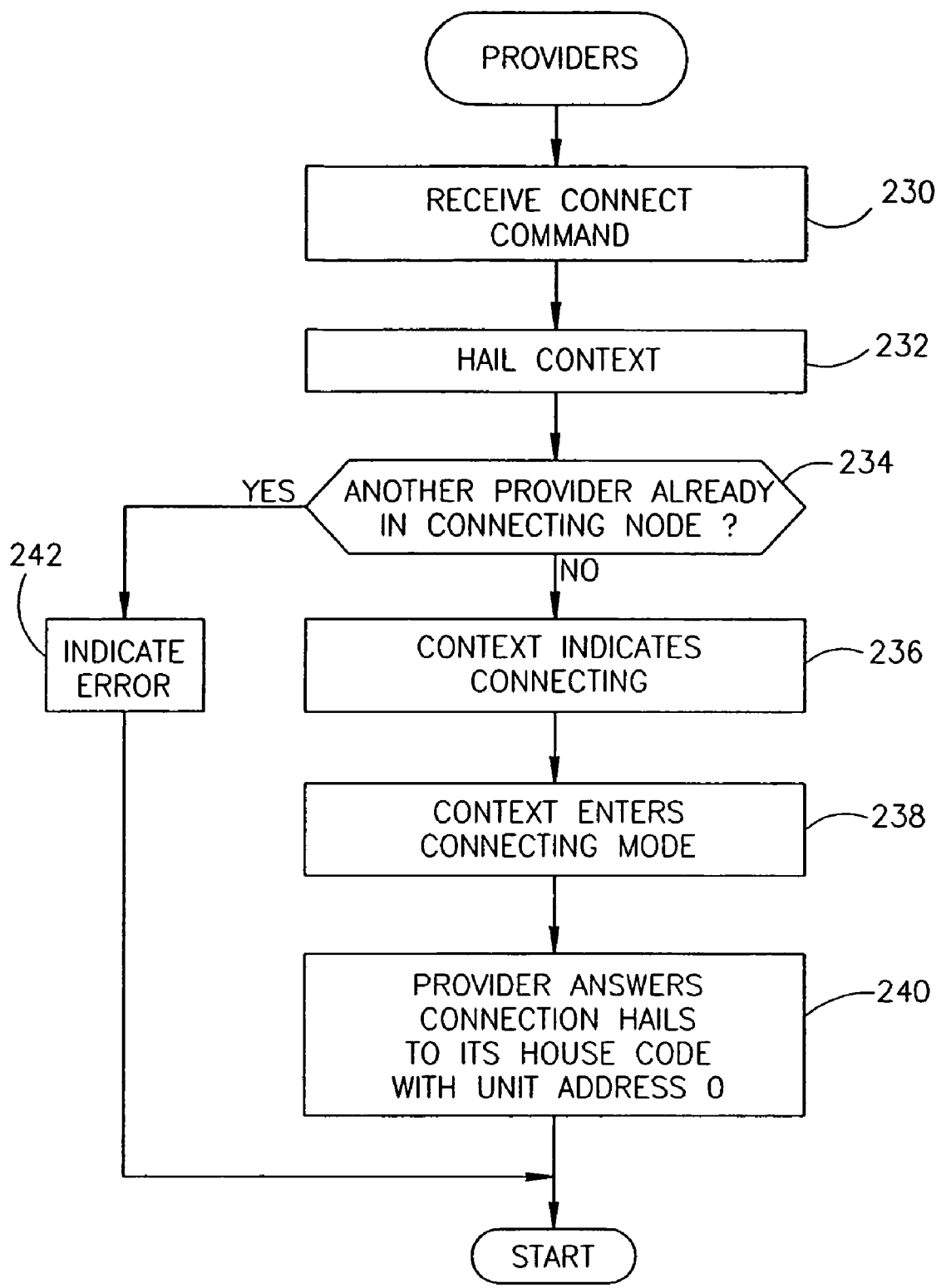
FIG. 18 is a flow diagram illustrating the portion of the CEBus compatible binding method of the present invention covering providers receiving the connect command.

A flow diagram illustrating the portion of the binding method of the present invention covering providers receiving the CONNECT command is shown in FIG. 18. For providers receiving the CONNECT command (step 230) the following is performed. The context hails up to three times (step 232) to determine whether another provider on this house code is already in connecting mode (step 234). If so, ERROR is indicated (step 242). If not, context indicates CONNECTING (step 236).

The context then enters connecting mode, remaining there until 10 minutes have passed wherein no other context asks to connect to it (step 238). In connecting mode, the provider answers connection hails to its house code with unit address 0 (step 240).

Figure 19:
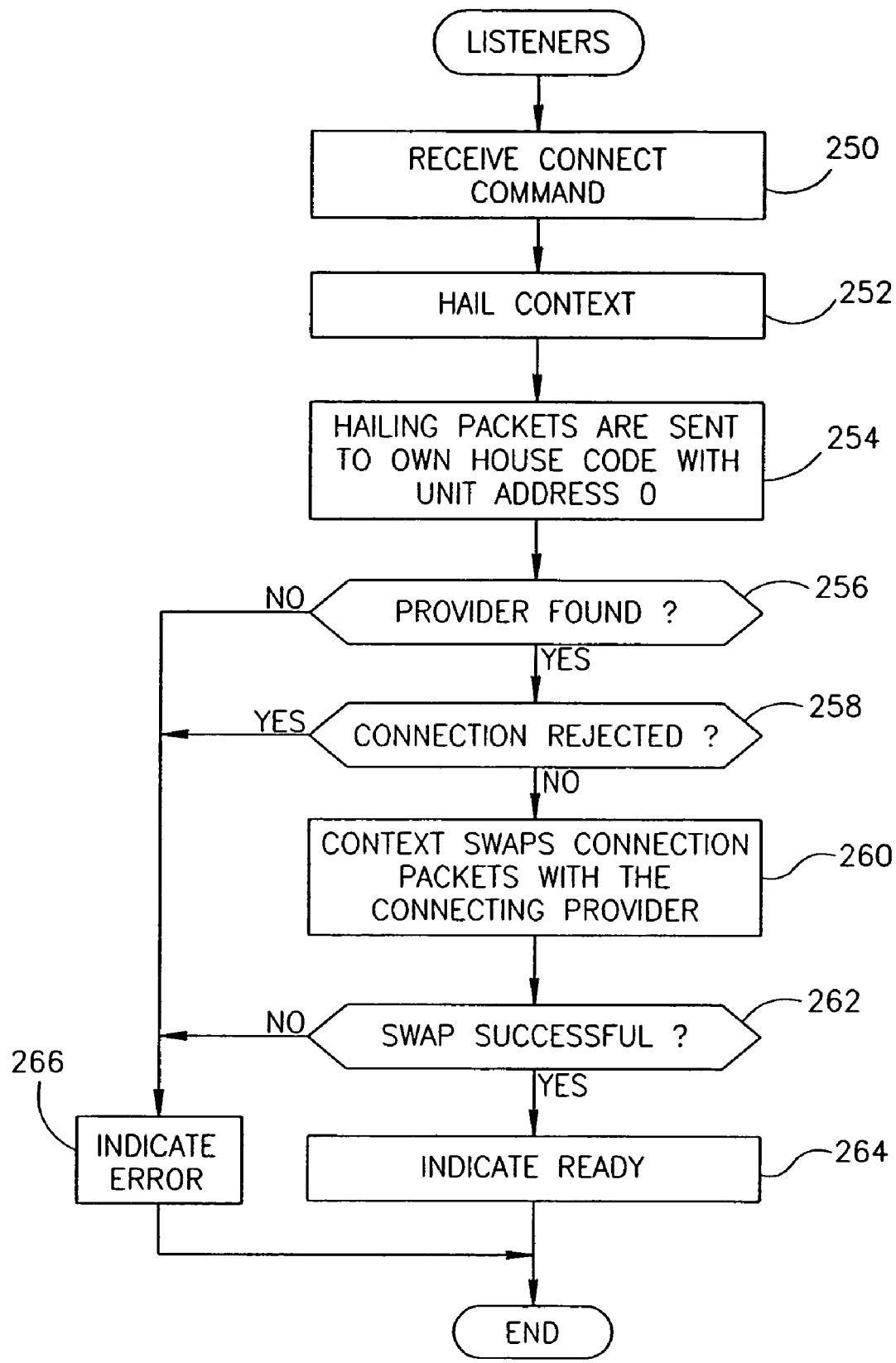
FIG. 19 is a flow diagram illustrating the portion of the CEBus compatible binding method of the present invention covering listeners receiving the connect command.

A flow diagram illustrating the portion of the binding method of the present invention covering listeners receiving the CONNECT command is shown in FIG. 19. For listeners receiving the CONNECT command (step 250) the context hails up to three times to find a provider in connecting mode (step 252). Hailing packets are sent to the context's own house code, with unit address 0 (step 254). If no provider is found (step 256) or if the provider rejects the potential connection in the hail packet (step 258), ERROR is indicated (step 266).

Once it is determined that the provider will accept the connection, the context swaps connection packets with the connecting provider (step 260). READY is indicated (step 264) by the listener context if the connection packets are swapped successfully (step 262). ERROR is indicated (step 266) if the connection packets fail three times or are rejected by the provider (step 262).

Figure 20:
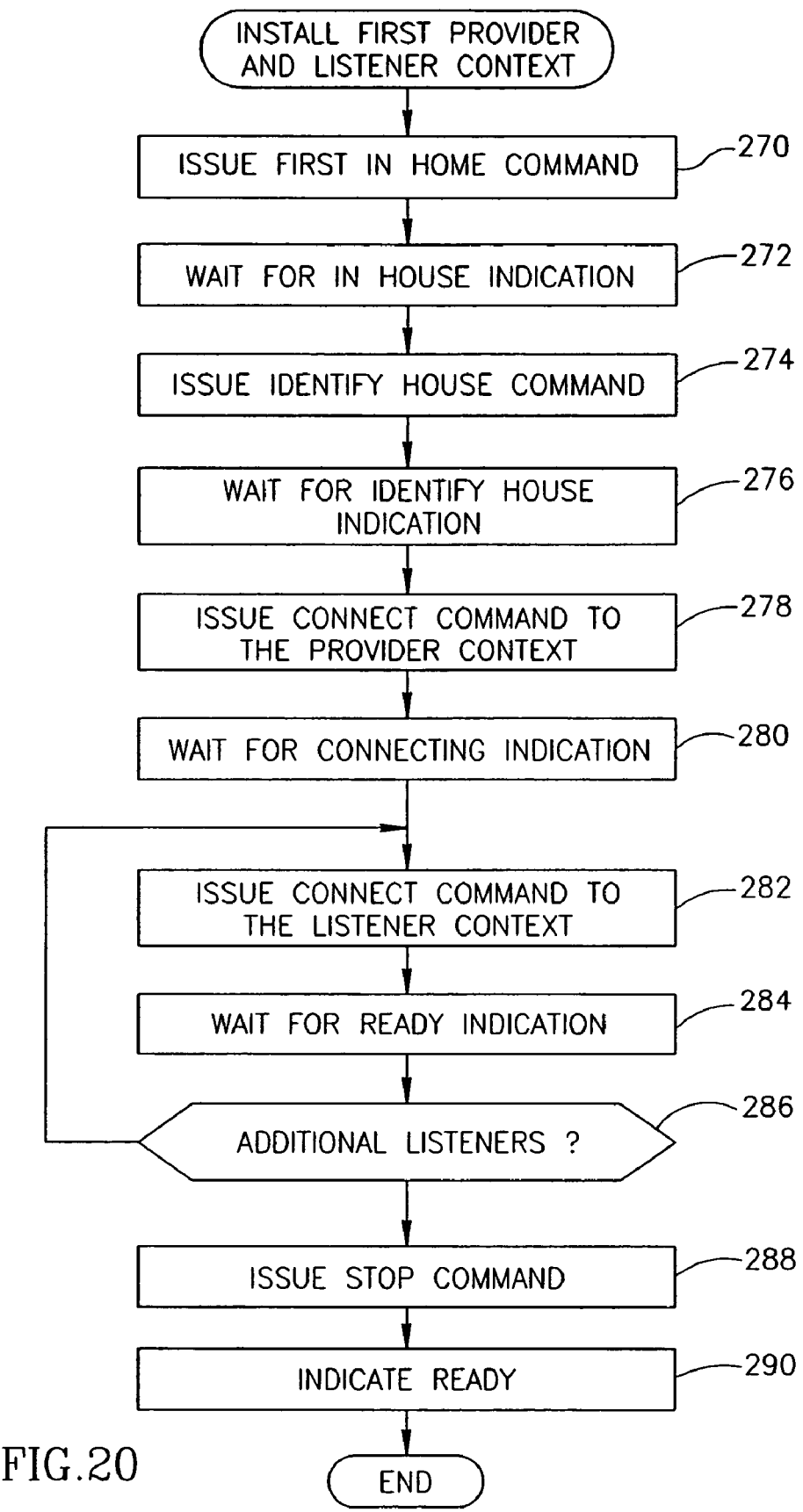
FIG. 20 is a flow diagram illustrating the portion of the CEBus compatible binding method of the present invention covering installation of the first provider and listener contexts.

A flow diagram illustrating the portion of the binding method of the present invention covering installation of the first provider and listener contexts is shown in FIG. 20. This method and the method of FIG. 21 use as an illustrative example, a light switch that functions as a provider context and a light fixture that functions as a listener context. To install the first light switch and light fixture, the following is performed. First, issue the FIRST IN HOUSE command to the light switch (step 270). Wait for the switch to indicate IN HOUSE (step 272).

Issue the IDENTIFY HOUSE command to the switch (step 274). Wait for the switch to indicate IDENTIFYING HOUSE (step 276). Issue the CONNECT command to the switch (step 278). Wait for the switch to indicate CONNECTING (step 280). Issue the CONNECT command to the fixture (step 282). Wait for the fixture to indicate READY (step 284). If there are additional listeners, i.e., fixtures, to be controlled by the switch (step 286) repeat steps 282 and 284. Once there are no additional listeners, issue the STOP command to the switch or wait 10 minutes (step 288). The switch will then indicate READY (step 290).

Figure 21:
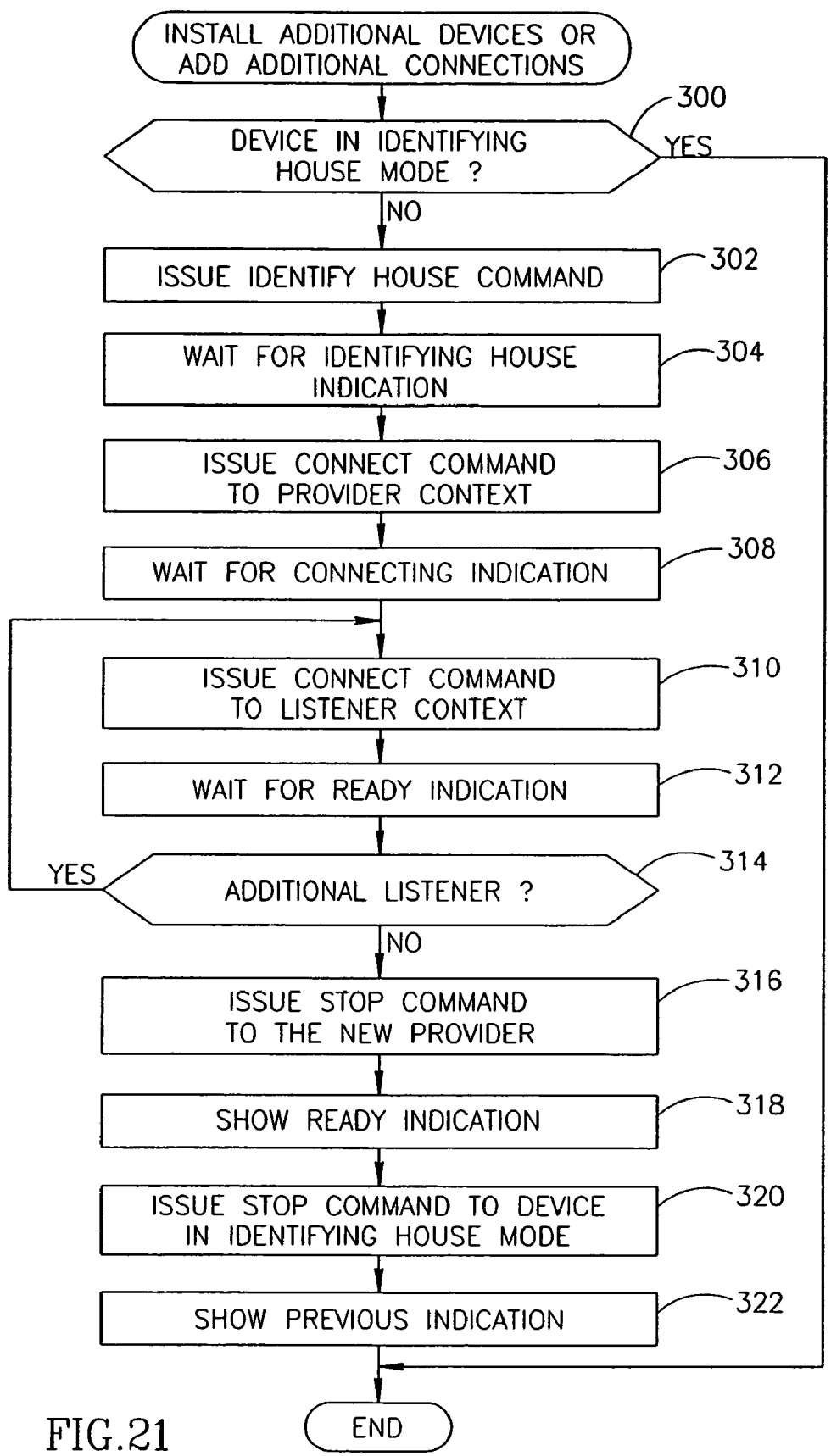
FIG. 21 is a flow diagram illustrating the portion of the CEBus compatible binding method of the present invention covering installation of additional devices or adding additional connections.

A flow diagram illustrating the portion of the binding method of the present invention covering installation of additional devices or adding additional connections is shown in FIG. 21. To install additional light switches and light fixtures, or to add additional connections to already connected switches or fixtures, the following is performed. It is first determined whether there is any device in IDENTIFYING HOUSE mode (step 300). If not, the IDENTIFYING HOUSE command is issued to an already installed switch or provider (step 302). Wait for the switch or provider to indicate IDENTIFYING HOUSE (step 304).

Issue the CONNECT command to the new switch (step 306) and wait for it to indicate CONNECTING (step 308). Issue the CONNECT command to the new fixture (step 310) and wait for it to indicate READY (step 312). If there are additional listeners, i.e., new fixtures, to be controlled by the new switch (step 314) repeat steps 310 and 312 for each one.

Once there are no additional devices to install, issue the STOP command to the new switch or wait 10 minutes (step 316) at which time it will indicate READY (step 318). If there are no additional devices to install, issue the STOP command to the device in IDENTIFYING HOUSE mode or wait 10 minutes (step 320). It will show its previous indication READY or IN HOUSE (step 322).

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of installing and binding a new device previously wired into an automation or multimedia network when said device is other than the first device installed in said network, said method comprising the steps of:
    placing said device in an additional-device installation mode of operation;
    placing address information of a previously installed and bound device onto said network;
    receiving said address information by said new device to be installed and updating its domain and subnet address information in accordance therewith;
    assigning a device ID number to said new device;
    generating an indication to indicate that the installation of said new device onto said network is complete;
    installing and binding zero or more additional new devices to said new device; and
    installing and binding zero or more existing devices to said new device.

2. The method according to claim 1, wherein said step of placing said device in an additional-device installation mode of operation comprises pressing an holding a pushbutton switch on said new device.

3. The method according to claim 1, wherein said step of placing said device in an additional-device installation mode of operation comprises receiving a command from a local management tool connected directly to said new device.

4. The method according to claim 1, wherein said step of placing said device in an additional-device installation mode of operation comprises receiving a command from a remote management tool connected remotely over said network.

5. The method according to claim 1, wherein said step of placing said device in an additional-device installation mode of operation comprises setting a visual or audible indication confirming that said device is in said installation mode of operation.

6. The method according to claim 1, further comprising the step of binding said new device if said new device was previously installed.

7. The method according to claim 1, wherein said step of receiving said address information comprises the steps of:
    waiting for reception of said address information sent from said previously installed and bound device; and
    generating an error indication in the event no response is received after expiration of a predetermined time period.

8. The method according to claim 1, wherein said step of assigning a device ID number to said new device comprises the steps of:
    querying said network using said assigned device ID number;
    listening for a response to said query; and
    assigning a new device ID number different than the original device ID number in the event a response is received within a predetermined time period.

9. The method according to claim 1, wherein said step of installing and binding additional new devices comprises the steps of:
    placing said additional new device in an additional-device installation mode of operation;
    placing address information of said new device onto said network;
    receiving said address information sent by said new device by said additional new device to be installed;
    updating domain and subnet address information in said additional new device in accordance with address information received from said new device;
    assigning a device ID number to said additional new device; and
    generating an indication associated with said additional new device to indicate that the installation of said additional new device onto said network is complete.

10. The method according to claim 1, wherein said step of installing and binding an existing device comprises the steps of:
    sending a message incorporating a first home profile from said existing device to said new device;
    updating a second address table within said new device in accordance with said first home profile;
    sending a message incorporating a second home profile message from said new device to said existing device;
    updating a first address table within said existing device in accordance with said second home profile;
    generating an indication associated with said existing device to indicate that the installation and binding of said existing device is complete.

* * * * *

UNITED STATES PATENT AND TRADEMARK OFFICE
CERTIFICATE OF CORRECTION

PATENT NO. : 7,219,141 B2  Page 1 of 1
APPLICATION NO. : 11/137810
DATED : May 15, 2007
INVENTOR(S) : Gaetano Bonasia et al.

It is certified that error appears in the above-identified patent and that said Letters Patent is hereby corrected as shown below:

Column 23 line 59, "an" should read -- and --

Signed and Sealed this

Nineteenth Day of August, 2008

JON W. DUDAS
*Director of the United States Patent and Trademark Office*